(12) United States Patent
Suzuki et al.

(10) Patent No.: US 12,077,832 B2
(45) Date of Patent: Sep. 3, 2024

(54) STEEL SHEET

(71) Applicant: NIPPON STEEL CORPORATION, Tokyo (JP)

(72) Inventors: Yuya Suzuki, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/025,862

(22) PCT Filed: Sep. 28, 2021

(86) PCT No.: PCT/JP2021/035603
§ 371 (c)(1),
(2) Date: Mar. 10, 2023

(87) PCT Pub. No.: WO2022/071305
PCT Pub. Date: Apr. 7, 2022

(65) Prior Publication Data
US 2023/0349022 A1    Nov. 2, 2023

(30) Foreign Application Priority Data

Sep. 30, 2020  (JP) .................................. 2020-164884

(51) Int. Cl.
*C21D 9/46*    (2006.01)
*B22D 11/00*    (2006.01)
(Continued)

(52) U.S. Cl.
CPC .............. *C21D 9/46* (2013.01); *B22D 11/001* (2013.01); *B32B 15/013* (2013.01); *C21D 6/001* (2013.01);
(Continued)

(58) Field of Classification Search
None
See application file for complete search history.

(56) References Cited

U.S. PATENT DOCUMENTS

2004/0234807 A1    11/2004    Suzuki et al.
2017/0218475 A1    8/2017    Kawasaki et al.
(Continued)

FOREIGN PATENT DOCUMENTS

JP    2007-262553 A    10/2007
WO    WO 03/074751 A1    9/2003
(Continued)

*Primary Examiner* — Daniel J. Schleis
(74) *Attorney, Agent, or Firm* — Birch, Stewart, Kolasch & Birch, LLP

(57) ABSTRACT

A steel sheet according to an aspect of the present invention has a predetermined chemical composition, in which a metallographic structure at a ¼ thickness portion includes, by volume percentage, a total of 50% or more of one or both of martensite and bainite and 8% or more of residual austenite, an average value of aspect ratios of prior austenite grains is 5.0 or more, number density of AlN is 3000 pieces/mm² or more and less than 6000 pieces/mm² at a depth position of 30 μm from a sheet surface, an internal oxidation layer in which at least a part of a crystal grain boundary is coated with an oxide is provided from the sheet surface to a depth of 5.0 μm or more, grain boundary coverage of the oxide is 60% or more in a region from the sheet surface to a depth of 5.0 μm, and a tensile strength is 980 MPa or more.

4 Claims, 4 Drawing Sheets

(51) Int. Cl.
*B32B 15/01* (2006.01)
*C21D 6/00* (2006.01)
*C21D 8/02* (2006.01)
*C22C 38/00* (2006.01)
*C22C 38/02* (2006.01)
*C22C 38/04* (2006.01)
*C22C 38/06* (2006.01)
*C22C 38/10* (2006.01)
*C22C 38/12* (2006.01)
*C22C 38/14* (2006.01)
*C22C 38/20* (2006.01)
*C22C 38/22* (2006.01)
*C22C 38/26* (2006.01)
*C22C 38/28* (2006.01)
*C22C 38/30* (2006.01)
*C22C 38/34* (2006.01)
*C22C 38/38* (2006.01)
*C22C 38/42* (2006.01)
*C22C 38/48* (2006.01)
*C22C 38/58* (2006.01)
*C22C 38/60* (2006.01)
*C23C 2/28* (2006.01)
*C23C 2/40* (2006.01)

(52) U.S. Cl.
CPC ............ *C21D 6/002* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/105* (2013.01); *C22C 38/12* (2013.01); *C22C 38/14* (2013.01); *C22C 38/20* (2013.01); *C22C 38/22* (2013.01); *C22C 38/26* (2013.01); *C22C 38/28* (2013.01); *C22C 38/30* (2013.01); *C22C 38/34* (2013.01); *C22C 38/38* (2013.01); *C22C 38/42* (2013.01); *C22C 38/48* (2013.01); *C22C 38/58* (2013.01); *C22C 38/60* (2013.01); *C23C 2/28* (2013.01); *C21D 2211/005* (2013.01); *C21D 2211/009* (2013.01); *C23C 2/40* (2013.01)

(56) References Cited

U.S. PATENT DOCUMENTS

2020/0325554 A1* 10/2020 Takeda ...................... C23C 2/28
2023/0349017 A1* 11/2023 Sakakibara ............. C22C 38/10

FOREIGN PATENT DOCUMENTS

WO    WO 2016/021195 A1    2/2016
WO    WO 2019/116531 A1    6/2019

* cited by examiner

STEEL SHEET

TECHNICAL FIELD OF THE INVENTION

The present invention relates to a steel sheet.

This application claims the right of priority based on Japanese Patent Application No. 2020-164884 filed with the Japan Patent Office on Sep. 30, 2020, the content of which is incorporated herein by reference.

RELATED ART

High strength steel sheets are used as steel sheets for a vehicle in order to reduce the weight of a vehicle, improve fuel efficiency, reduce the amount of emission of carbon dioxide gas, and secure the safety of passengers. Such steel sheets are also required to have ductility to secure good workability, in addition to strength. Further, in recent years, in order to sufficiently secure the corrosion resistance of a vehicle body and parts, high strength hot-dip galvannealed steel sheets have also been used in addition to high strength hot-dip galvanized steel sheets.

However, when, for assembly of a vehicle body and/or parts, a high strength hot-dip galvanized steel sheet and a hot-dip galvannealed steel sheet are spot-welded, or a high strength cold-rolled steel sheet and a galvanized steel sheet are spot-welded, cracking (LME cracking) due to liquid metal embrittlement (LME) may occur in a spot-welding portion. The LME cracking is cracking that occurs when tensile stress acts on a welding portion in a state where zinc in a galvanized layer melts due to heat that is generated during spot welding and the molten zinc invades crystal grain boundaries of a steel sheet structure of the welding portion. The invasion of the molten zinc into the crystal grain boundaries makes the crystal grain boundaries embrittle and easily causes embrittlement cracking.

LME remarkably occurs when a high strength TRIP steel sheet (transformation-induced plasticity steel sheet) is spot-welded. The high strength TRIP steel sheet is a steel sheet having excellent energy absorption power and press formability by including residual austenite.

Further, LME generally occurs during spot welding of high strength steel sheets subjected to galvanizing. However, even in a high strength cold-rolled steel sheet that is not subjected to galvanizing, when it is spot-welded to the galvanized steel sheet, zinc melted in the galvanized steel sheet comes into contact with the high strength cold-rolled steel sheet, so that there is a case where LME occurs.

FIG. 1 schematically shows an aspect of LME occurred in a welding portion. A steel sheet $1a$, a steel sheet $1b$, and a steel sheet $1c$ are superimposed and spot-welded to form a nugget 2, so that the three steel sheets can be joined together. At this time, as shown in FIG. 1, there is a case where an inner crack $3a$ occurs between the steel sheets, an outer crack $3b$ occurs at a contact portion between the steel sheet and a spot welding electrode, and an outer crack $3c$ occurs at a steel sheet portion that is not in direct contact with the electrode.

As described above, the zinc of the plating layer melted by the heat at the time of welding invades the crystal grain boundaries of the welding portion structure, so that the grain boundaries become embrittle, and LME occurs due to stress that is generated around the welding portion during welding. LME can occur not only in a case where three steel sheets are superimposed and welded, as illustrated in FIG. 1. but also in a case where two or four steel sheets are superimposed and spot-welded.

As a high strength hot-dip galvanized steel sheet, for example, Patent Document 1 discloses a hot-dip galvanized steel sheet having a composition including, by a mass ratio, C: 0.05 to 0.30%, Mn: 0.8 to 3.00%, P: 0.003 to 0.100%, S: 0.010% or less, Al: 0.10 to 2.50%, Cr: 0.03 to 0.500%, N: 0.007% or less, and a remainder substantially including Fe and unavoidable impurities, in which the steel sheet includes ferrite, residual austenite, and a low temperature transformation phase, a fraction of the ferrite is 97% or less by a volume fraction, and the steel sheet has a structure in which AlN is precipitated to a region from the steel sheet surface to 1 μm except for a plating layer, and characteristics in which the tensile strength (TS) is 590 MPa or more and fatigue strength (FL) in a state of having a punch fractured surface is 200 MPa or more.

Patent Document 2 discloses a steel sheet in which a chemical composition of a base metal includes, by mass %. C: 0.17 to 0.40%, Si: 0.10 to 2.50%, Mn: 1.00 to 10.00%, P: 0.001 to 0.03%, S: 0.0001 to 0.02%, Al: 0.001 to 2.50%, N: 0.0001 to 0.010%. O: 0.0001 to 0.010%, Ti: 0 to 0.10%, Nb: 0 to 0.10%, V: 0 to 0.10%, B: 0 to 0.010%, Cr: 0 to 2.00%, Ni: 0 to 2.00%, Cu: 0 to 2.00%, Mo: 0 to 2.00%, Ca: 0 to 0.50%, Mg: 0 to 0.50%, REM: 0 to 0.50%, and a remainder: Fe and impurities, an internal oxidation layer in which at least a part of a crystal grain boundary is coated with an oxide is provided from the surface of the base metal to a depth of 5.0 μm or more, and grain boundary coverage of the oxide is 60% or more in a region from the surface of the base metal to the depth of 5.0 μm. In Patent Document 2, it is described that the invasion of molten zinc during welding is suppressed by covering the crystal grain boundary in the surface layer of the base metal with an internal oxide in advance.

Patent Document 3 discloses a method for manufacturing a high strength steel sheet including a hot rolling step in which a steel slab having a predetermined composition is heated to a temperature of 1100° C. or higher and 1300° C. or lower, is hot-rolled at a finish rolling outlet side temperature of 800° C. or higher and 1000° C. or lower, and then coiled at an average coiling temperature of 200° C. or higher and 500° C. or lower, thereby forming a hot-rolled steel sheet, a pickling step in which pickling is performed on the hot-rolled steel sheet, and an annealing step in which the hot-rolled steel sheet is held at a temperature of 740° C. or higher and 840° C. or lower for a time of 10 s or longer and 900 s or shorter, then cooled at an average cooling rate of 5° C./s or faster and 50° C./s or slower to a cooling stop temperature of higher than 350° C. and 550° C. or lower, and held for a time of 10 s or longer at a temperature range of higher than 350° C. and 550° C. or lower.

Patent Document 4 discloses a surface-treated steel sheet which has a surface-treated layer on the surface of a steel sheet having a steel composition containing Al of 0.1% or more and less than 3% by mass %, and in which an AlN precipitation layer is present on the base metal side near the interface between the steel sheet and the surface-treated layer.

PRIOR ART DOCUMENT

Patent Documents

[Patent Document 1] Japanese Unexamined Patent Application, First Publication No. 2007-262553
[Patent Document 2] PCT International Publication No. WO2019/116531

[Patent Document 3] PCT International Publication No. WO2016/021195

[Patent Document 4] PCT International Publication No. WO2003/074751

DISCLOSURE OF THE INVENTION

Problems to be Solved by the Invention

However, Patent Document 1 does not disclose a steel sheet having a tensile strength of 980 MPa or more. Furthermore, in Patent Document 1, no particular study has been made on LME resistance.

Further, the inventors of the present invention have found that, according to the technique of Patent Document 2, there is a concern that the hole expansibility of the steel sheet may be impaired. Patent Document 2 describes that in order to promote internal oxidation of a steel sheet, it is preferable that annealing is performed in an atmosphere containing 0.1 to 30% by volume of hydrogen, $H_2O$ having a dew point in a range of −40 to 20° C., and a remainder which includes nitrogen and impurities. If a steel sheet is annealed in such an atmosphere. not only internal oxidation but also decarburization proceeds in the surface layer of the steel sheet. At this time, ferrite grains in the decarburized layer become coarse. If the ferrite grains in the surface layer of the steel sheet become coarse, since the resistance to the growth of cracks generated during deformation for hole expansion decreases, the hole expansibility of the steel sheet deteriorates.

Even in Patent Document 3, no particular study has been made on the LME resistance. Further, according to the study by the inventors of the present invention, it has been found that it is difficult to obtain the LME resistance and a high hole expansion rate without optimizing the manufacturing conditions at a casting step for manufacturing a slab. On the other hand. Patent Document 3 does not disclose any specific manufacturing conditions at the casting step. Further, Patent Document 3 does not suggest any influence on the finally obtained steel sheet by optimization of the manufacturing conditions at the casting step.

In Patent Document 4, the surface-treated steel sheet in which the AlN precipitation layer is present on the base metal side near the interface between the steel sheet and the surface-treated layer is disclosed. However, it is considered that the number density of AlN is out of the range of 3000 pieces/mm$^2$ or more and less than 6000 pieces/mm$^2$. In Patent Document 4, it is described that AlN is produced during heating holding of a slab (steel piece) after continuous casting, or during continuous annealing, and specifically, on page 7, lines 15 to 18, it is stated that regarding a method of forming the AlN precipitation layer, the conditions at the time of the heating holding of the steel piece were examined based on the idea that if Al in the surface layer of the steel piece is nitrided at the time of the heating holding of the steel piece, there is a possibility that Al in the surface layer may be present as AlN even after subsequent hot rolling, pickling, and cold rolling. Further, on page 9, lines 14 to 17, it is stated that as the method of forming the AlN precipitation layer, it can be performed by annealing in a nitriding element atmosphere such as a $H_2$—$N_2$ system in which a small amount of CO or $NH_3$ is mixed, in the annealing step immediately before hot-dip galvanizing. In these manufacturing methods stated in Patent Document 4, the number of AlNs is reduced because the creation of AlN is promoted and the "growth" of AlN is promoted to form coarse AlN. As a result, the number density of AlN is considered to be less than the range of 3000 pieces/mm$^2$ or more and less than 6000 pieces/mm$^2$, and the hole expansibility deteriorates.

If an attempt is made to increase the LME resistance of a high strength TRIP steel sheet by using an internal oxidation layer, a problem of deterioration in hole expansibility arises. Further, the high strength TRIP steel sheet is also required to have ductility in order to secure workability. Therefore, the present invention has an object to provide a steel sheet which is a TRIP steel sheet having a tensile strength of 980 MPa or more, is capable of suppressing LME, and has a high strength-ductility balance and a high hole expansion rate.

Means for Solving the Problem

The gist of the present invention is as follows.

(1) A steel sheet according to an aspect of the present invention includes, as a chemical composition, by mass %, C: 0.150% or more and 0.300% or less, Si: 0.30% or more and 2.50% or less, Mn: 1.50% or more and 4.00% or less, Al: 0.30% or more and 2.00% or less, P: 0% or more and 0.0400% or less, S: 0% or more and 0.0100% or less, N: 0.0025% or more and 0.0100% or less. O: 0% or more and 0.0060% or less, Cr: 0% or more and 0.500% or less, Ni: 0% or more and 1.000% or less, Cu: 0% or more and 1.000% or less, Mo: 0% or more and 0.500% or less, Ti: 0% or more and 0.200% or less, Nb: 0% or more and 0.200% or less, V: 0% or more and 0.500% or less, B: 0% or more and 0.0100% or less, W: 0% or more and 0.100% or less, Ta: 0% or more and 0.100% or less, Sn: 0% or more and 0.050% or less, Co: 0% or more and 0.500% or less, Sb: 0% or more and 0.050% or less, As: 0% or more and 0.050% or less, Mg: 0% or more and 0.050% or less, Ca: 0% or more and 0.040% or less. Y: 0% or more and 0.050% or less, La: 0% or more and 0.050% or less, Ce: 0% or more and 0.050% or less, Zr: 0% or more and 0.050% or less, and a remainder comprising Fe and impurities, in which a metallographic structure at a ¼ thickness portion includes, by volume percentage, a total of 50% or more of one or both of martensite and bainite and 8% or more of residual austenite, and a remainder is one or both of ferrite and pearlite, an average value of aspect ratios of prior austenite grains is 5.0 or more at the ¼ thickness portion, number density of AlN is 3000 pieces/mm$^2$ or more and less than 6000 pieces/mm$^2$ at a depth position of 30 μm from a sheet surface, an internal oxidation layer in which at least a part of a crystal grain boundary is coated with an oxide is provided from the sheet surface to a depth of 5.0 μm or more, grain boundary coverage of the oxide is 60% or more in a region from the sheet surface to a depth of 5.0 μm, and a tensile strength is 980 MPa or more.

(2) The steel sheet according to the above (1) may have hot-dip galvanizing plating or hot-dip galvannealing plating.

(3) In the steel sheet according to the above (1) or (2), a part or all of the martensite at the ¼ thickness portion may be tempered martensite, and a volume percentage of the tempered martensite at the ¼ thickness portion may be 5% or more.

Effects of the Invention

According to the present invention, it is possible to provide a steel sheet which is a TRIP steel sheet having a tensile strength of 980 MPa or more, is capable of suppressing LME, and has a high strength-ductility balance and a high hole expansion rate.

EMBODIMENTS OF THE INVENTION

Figure 1:
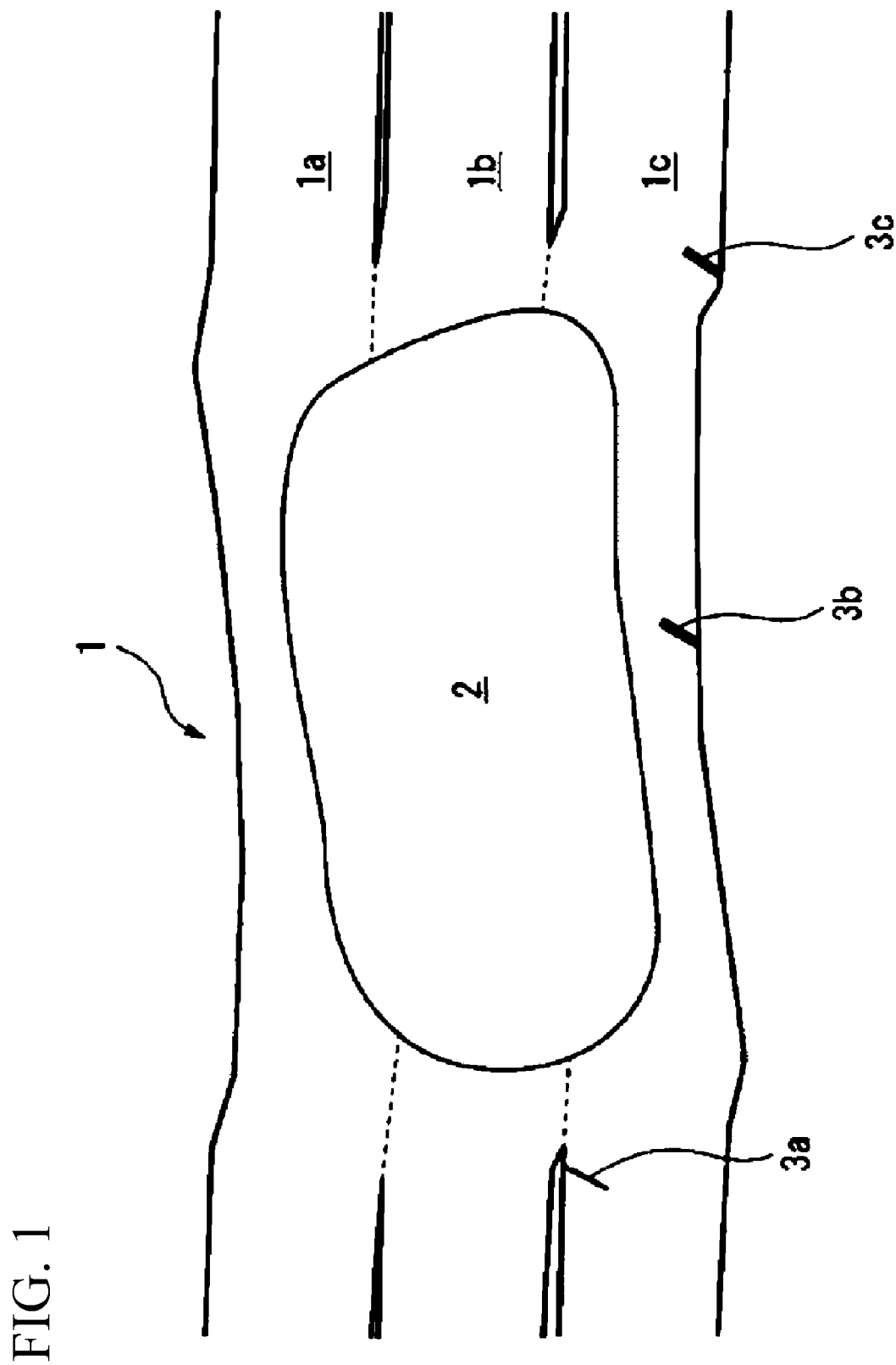
FIG. 1 is a diagram schematically showing an aspect of LME generated in a welding portion.

As one of means for improving the LME resistance of a TRIP steel sheet, it was considered to stabilize residual austenite by using Al instead of Si. Si is an important element for suppressing the precipitation of iron-based carbides in austenite and securing the volume percentage of residual austenite of a steel sheet structure. On the other hand, Si is also an element that promotes LME cracking. Therefore, it is necessary to stabilize the residual austenite by using Al instead of a part of Si.

Further, it was considered that as another means for improving the LME resistance of a TRIP steel sheet, it is effective to form an internal oxidation layer on the surface layer of the steel sheet. This is because the invasion of molten zinc during welding is suppressed by covering a crystal grain boundary in the surface layer of the base metal with an internal oxide in advance.

However, if a TRIP steel sheet containing a large amount of Al is annealed in an atmosphere suitable for forming an internal oxidation layer, not only internal oxidation but also decarburization proceeds in the surface layer of the steel sheet. At this time, ferrite grains in the decarburized layer become coarse. This is because Al raises a transformation temperature of a metallographic structure, and eventually raises an annealing temperature of the TRIP steel sheet. The higher the annealing temperature, the more the grain growth in the decarburized layer is promoted, and the ferrite grains become coarser. If the ferrite grains in the surface layer of the steel sheet become coarse, since the resistance to the growth of cracks which occur during deformation for hole expansion decreases, the hole expansion rate of the steel sheet deteriorates. In this manner, if two means for preventing the LME cracking are combined, another problem such as deterioration in hole expansibility arises.

In order to solve this problem, the inventors of the present invention have made extensive studies. Then, the inventors of the present invention have discovered that the surface layer state of a steel sheet after an annealing step can be improved by optimizing a continuous casting step, which is a step far before the annealing step. Specifically, it has been found by the inventors of the present invention that if a steel sheet is manufactured using a slab in which AlN having high number density is dispersed in a surface layer and the steel sheet is annealed in an atmosphere suitable for forming an internal oxidation layer, the ferrite grains of the surface layer become finer and the hole expansibility is dramatically improved. Further, it has also been found by the inventors of the present invention that it is possible to disperse AlN in the surface layer of the slab at higher number density by controlling bending stress of the slab and a cooling rate in the continuous casting step.

In addition, the inventors of the present invention have also found that in order to increase the ductility of a high strength TRIP steel sheet to obtain a high strength-ductility balance, it is effective to increase the aspect ratio of martensite and bainite.

The steel sheet according to the present embodiment obtained by the above findings has a predetermined chemical composition, in which a metallographic structure at a ¼ thickness portion includes, by volume percentage, a total of 50% or more of one or both of martensite and bainite and 8% or more of residual austenite, and a remainder is one or both of ferrite and pearlite, an average value of aspect ratios of prior austenite grains is 5.0 or more at the ¼ thickness portion, the number density of AlN is 3000 pieces/mm$^2$ or more and less than 6000 pieces/mm$^2$ at the depth position of 30 μm from the sheet surface, an internal oxidation layer in which at least a part of a crystal grain boundary is coated with an oxide is provided from the sheet surface to the depth of 5.0 μm or more, grain boundary coverage of the oxide is 60% or more in a region from the sheet surface to the depth of 5.0 μm, and the tensile strength is 980 MPa or more. The steel sheet according to the present embodiment will be described in detail below.

The term "martensite" is a concept that includes both fresh martensite, which is untempered martensite, and tempered martensite, which is martensite subjected to tempering. Hereinafter, in a case of being simply referred to as "martensite", it means both the fresh martensite and the tempered martensite. Further, the "amount of martensite" means the total amount of the fresh martensite and the tempered martensite.

(A) Chemical Composition of the Steel Sheet

First, the chemical composition of the steel sheet according to the present embodiment will be described. The reasons for limiting the content of each element are as follows. In the following description, "%" for the content means "mass %".

C: 0.150% or More and 0.300% or Less

Carbon (C) is an element necessary for improving the strength of the steel sheet. When the C content is less than 0.150%, the strength is insufficient. On the other hand, when the C content exceeds 0.300%, ductility and hole expansibility are impaired. Therefore, the C content is set to a value in a range of 0.150 to 0.300%. The C content is preferably 0.180% or more, 0.200% or more, or 0.220% or more. Further, the C content is preferably 0.280% or less, 0.250% or less, or 0.230% or less.

Si: 0.30% or More and 2.50% or Less

Silicon (Si) is an element that contributes to the improvement of the strength of the steel sheet by suppressing the tempering softening of the martensite, in addition to solid solution strengthening. Further, Si is an important element for suppressing the precipitation of iron-based carbides in austenite and securing the volume percentage of residual austenite of the steel sheet structure, in the steel sheet whose workability is improved by the transformation-induced plasticity property (TRIP effect) of the residual austenite.

When the Si content is less than 0.30%, the hardness of the tempered martensite is significantly reduced, and the residual austenite cannot be sufficiently obtained, resulting in insufficient workability. On the other hand, when the Si content exceeds 2.50%, the steel sheet becomes embrittle, the ductility is lowered, the plating property is lowered, and non-plating easily occurs. Therefore, the Si content is set to a value in a range of 0.30 to 2.50%. The Si content is preferably 0.50% or more, 0.60% or more, 0.80% or more, or 1.00% or more. Further, the Si content is preferably 2.00% or less, 1.80% or less, or 1.50% or less.

Mn: 1.50% or More and 4.00% or Less

Manganese (Mn) is an element that enhances hardenability and contributes to the improvement of the strength of the steel sheet. When the Mn content is less than 1.50%, a soft structure is created during cooling after annealing, and it becomes difficult to secure the strength. On the other hand, when the Mn content exceeds 4.00%, the plating property is lowered and workability and weldability are lowered due to selective oxidation during reduction and annealing. Therefore, the Mn content is set to 1.50% or more and 4.00% or less. The Mn content is preferably 1.80% or more, 2.00% or more, or 2.20% or more. Further, from the viewpoint of weldability, the Mn content is preferably 3.50% or less, 3.20% or less, or 3.00% or less.

Al: 0.30% or More and 2.00% or Less

Aluminum (Al) is a deoxidizing element and is an element that forms AlN by modifying the internal oxidation layer of the steel sheet to improve the hole expansibility. When the Al content is less than 0.30%, these effects cannot be sufficiently obtained. On the other hand, when the Al content exceeds 2.00%, there is a concern that a slab may become embrittle and cracking may occur. Therefore, the Al content is set to 0.30% or more and 2.00% or less. The Al content is preferably 0.50% or more, 0.70% or more, 0.80% or more, or 1.00% or more. Further, the Al content is preferably 1.90% or less, 1.70% or less, or 1.50% or less.

P: 0% or More and 0.0400% or Less

Phosphorus (P) is not an indispensable element for solving the problem of the steel sheet according to the present embodiment. Therefore, the P content may be set to 0%. On the other hand, P is an element having an action of increasing the strength of the steel sheet and suppressing the invasion of molten zinc into the steel sheet structure. When the P content is set to 0.0010% or more, the above effects can be sufficiently obtained, which is preferable. On the other hand, when the P content exceeds 0.0400%, the steel sheet becomes embrittle due to segregation of P to the crystal grain boundaries. Therefore, the P content is set to 0% or more and 0.0400% or less. The P content is more preferably 0.0050% or more, or 0.0100% or more. Further, the P content is preferably 0.0350% or less, 0.0300% or less, or 0.0200% or less.

S: 0% or More and 0.0100% or Less

Sulfur (S) is not an indispensable element for solving the problem of the steel sheet according to the present embodiment. Further, S is an element that causes hot embrittlement and impairs weldability and corrosion resistance. Therefore, the S content may be set to 0%. However, in order to make the S content be less than 0.0001%, the manufacturing cost increases significantly. Therefore, the S content may be set to 0.0001% or more. On the other hand, when the S content exceeds 0.0100%, hot workability, weldability, and corrosion resistance are significantly lowered. Therefore, the S content is set to 0% or more and 0.0100% or less. The S content is more preferably 0.0002% or more, or 0.0005% or more. Further, the S content is preferably 0.0080% or less, 0.0050% or less, or 0.0030% or less.

N: 0.0025% or More and 0.0100% or Less

Nitrogen (N) is an element that forms AlN, which modifies the internal oxidation layer of the steel sheet to improve hole expansibility. When the N content is less than 0.0025%, this effect cannot be sufficiently obtained. On the other hand, when N exceeds 0.0100%, stretch flangeability is significantly lowered, and blow holes are generated during welding. Therefore, the N content is set to 0.0025% or more and 0.0100% or less. The N content may be set to 0.0030% or more, or 0.0035% or more. Further, the N content may be set to 0.0090% or less, 0.0085% or less, or 0.0080% or less.

O: 0% or More and 0.0060% or Less

Oxygen (O) is not an indispensable element for solving the problem of the steel sheet according to the present embodiment. Further, O is an element that forms an oxide and impairs stretch flangeability. Therefore, the O content may be set to 0%. However, in order to make the O content be less than 0.0001%, the manufacturing cost increases significantly. Therefore, the O content may be set to 0.0001% or more. On the other hand, when the O content exceeds 0.0060%, the stretch flangeability is significantly lowered. Therefore, the O content is set to 0% or more and 0.0060% or less. The smaller the O content, the more preferable. However, from the viewpoint of manufacturing cost, the O content is preferably 0.0005% or more, or 0.0010% or more. Further, the O content is preferably 0.0040% or less, 0.0030% or less, or 0.0020% or less.

The steel sheet according to the present embodiment may further contain the following elements. However, the elements listed below are not indispensable elements for solving the problem of the steel sheet according to the present embodiment. Therefore, the lower limits of the elements listed below are 0%.

Cr: 0% or More and 0.500% or Less

Ni: 0% or More and 1.000% or Less

Cu: 0% or More and 1.000% or Less

Chromium (Cr), nickel (Ni), and copper (Cu) are elements that contribute to the improvement of strength. Therefore, one or more elements selected from these elements may be contained as needed.

However, there is a concern that Cr of more than 0.500%, Ni of more than 1.000%, or Cu of more than 1.000% may reduce a pickling property, weldability, and hot workability.

Therefore, the Cr content is set to 0.500% or less, the Ni content is set to 1.000% or less, and the Cu content is set to 1.000% or less. The Cr content may be 0.400% or less, 0.300% or less, or 0.100% or less. The Ni content may be 0.800% or less, 0.600% or less, or 0.200% or less. The Cu content may be 0.800% or less, 0.600% or less, or 0.200% or less. In a case where the above effects are desired, one or more elements selected from Cr, Ni, and Cu are contained, and the content thereof is preferably 0.001% or more, and more preferably 0.100% or more.

Mo: 0% or More and 0.500% or Less

Molybdenum (Mo) is an element that enhances the hardenability of steel and contributes to the improvement of strength, like Mn. Therefore, Mo may be contained as needed. However, when the Mo content exceeds 0.500%, there is a concern that hot workability may be lowered and productivity may be lowered. Therefore, the Mo content is set to 0.500% or less. The Mo content is preferably 0.400% or less, 0.300% or less, or 0.100% or less. In a case where the above effects are desired, the Mo content is preferably 0.010% or more, and more preferably 0.100% or more.

Ti: 0% or More and 0.200% or Less

Nb: 0% or More and 0.200% or Less

V: 0% or More and 0.500% or Less

Titanium (Ti), niobium (Nb), and vanadium (V) are elements that contribute to the improvement of the strength of the steel sheet by means of precipitation strengthening, fine grain strengthening by suppressing the growth of crystal grains, and dislocation strengthening by suppressing recrystallization. Therefore, one or more elements selected from these elements may be contained as needed.

However, there is a concern that Ti of more than 0.200%, Nb of more than 0.200%, or V of more than 0.500% may precipitate coarse carbonitrides to reduce formability. Therefore, the Ti content is set to 0.200% or less, the Nb content is set to 0.200% or less, and the V content is set to 0.500% or less. The Ti content may be set to 0.180% or less, 0.150% or less, or 0.100% or less. The Nb content may be set to 0.180% or less, 0.150% or less, or 0.100% or less. The V content may be set to 0.400% or less, 0.300% or less, or 0.100% or less. In a case where the above effects are desired, it is preferable that the steel sheet contains one or more elements selected from 0.001% or more of Ti, 0.0001% or more of Nb, and 0.001% or more of V.

B: 0% or More and 0.0100% or Less

Boron (B) is an element that segregates to an austenite grain boundary during welding to strengthen crystal grain boundaries and contribute to the improvement of the liquid metal embrittlement cracking resistance. Therefore, B may be contained as needed. However, when the B content exceeds 0.0100%, carbides and nitrides are generated, the above effects are saturated, and hot workability is lowered. Therefore, the B content is set to 0.0100% or less. The B content is preferably 0.0080% or less, 0.0050% or less, or 0.0030% or less. In a case where the above effects are desired, the B content is preferably 0.0001% or more, and more preferably 0.0005% or more, or 0.0008% or more.

W: 0% or More and 0.100% or Less

Ta: 0% or More and 0.100% or Less

Sn: 0% or More and 0.050% or Less

Co: 0% or More and 0.500% or Less

Sb: 0% or More and 0.050% or Less

As: 0% or More and 0.050% or Less

W, Ta, Sn, Co, Sb, and As are elements which are derived from scrap or the like that may be used as a material for the steel sheet, and which may be mixed in the steel sheet according to the present embodiment. From the viewpoint of material cost, some interfusion of these elements is acceptable. However, if the amount of these elements is large, there is a concern that various properties of the steel sheet may be impaired. Therefore, the W content is set to 0.100% or less, the Ta content is set to 0.100% or less, the Sn content is set to 0.050% or less, the Co content is set to 0.500% or less, the Sb content is set to 0.050% or less, and the As content is set to 0.050% or less.

The W content may be set to 0.080% or less, 0.050% or less, or 0.030% or less. Further, the W content may be set to 0.001% or more, 0.005% or more, or 0.010% or more.

The Ta content may be set to 0.080% or less, 0.050% or less, or 0.030% or less. Further, the Ta content may be set to 0.001% or more, 0.005% or more, or 0.010% or more.

The Sn content may be set to 0.040% or less, 0.030% or less, or 0.010% or less. Further, the Sn content may be set to 0.001% or more, 0.002% or more, or 0.005% or more.

The Co content may be set to 0.400% or less, 0.300% or less, or 0.100% or less. Further, the Co content may be set to 0.001% or more, 0.010% or more, or 0.050% or more.

The Sb content may be set to 0.040% or less, 0.030% or less, or 0.010% or less. Further, the Sb content may be set to 0.001% or more, 0.002% or more, or 0.005% or more.

The As content may be set to 0.040% or less, 0.030% or less, or 0.010% or less. Further, the As content may be set to 0.001% or more, 0.002% or more, or 0.005% or more.

Mg: 0% or More and 0.050% or Less

Ca: 0% or More and 0.040% or Less

Y: 0% or More and 0.050% or Less

La: 0% or More and 0.050% or Less

Ce: 0% or More and 0.050% or Less

Zr: 0% or More and 0.050% or Less

Calcium (Ca), magnesium (Mg), yttrium (Y), lantern (La), cerium (Ce), and zirconium (Zr) are elements that contribute to the improvement of formability. Therefore, one or more elements selected from these elements may be contained as needed.

However, there is a concern that Mg, Y, La, Ce, or Zr exceeding 0.050%, or Ca exceeding 0.040% may reduce a pickling property, weldability, and hot workability. Therefore, the contents of Mg, Y, La, Ce, and Zr are set to 0.050% or less, and the content of Ca is set to 0.040% or less. The content of each of Mg, Ca, Y, La, Ce, and Zr is preferably 0.035% or less, 0.030% or less, or 0.010% or less, and the content of Ca is preferably 0.035% or less, 0.030% or less, or 0.010% or less. In a case where the above effects are desired, one or more elements selected from Mg, Ca, Y, La, Ce, and Zr are contained, and the content thereof is more preferably 0.0001% or more or 0.001% or more.

In the chemical composition of the steel sheet according to the present invention, a remainder is Fe and impurities. Here, the impurities refers to components which are mixed in due to various factors of raw materials such as ore and scrap, and a manufacturing process when a steel sheet is industrially manufactured, and are allowed as long as they do not adversely affect the present invention.

(B) Metallographic structure at the ¼ thickness portion of the steel sheet

Next, the metallographic structure at the ¼ thickness portion of the steel sheet will be described. The ¼ thickness portion refers to a position at a depth of ¼ of the sheet thickness from the sheet surface and the vicinity thereof.

In the steel sheet according to the present embodiment, the metallographic structure at the ¼ thickness portion includes one or both of martensite and bainite. In order to secure the strength of the steel sheet, the volume percentage of these structures at the ¼ thickness portion is set to 50% or more in total. The total volume percentage of one or both of the martensite and the bainite at the ¼ thickness portion may be 60% or more, 65% or more, or 70% or more. It is not necessary to specify the upper limit of the volume percentage of these structures. However, considering the lower limit of the volume percentage of the residual austenite, which will be described later, the total volume percentage of one or both of the martensite and the bainite at the ¼ thickness portion is substantially 92% or less. The total volume percentage of one or both of the martensite and the bainite at the ¼ thickness portion may be 90% or less, 85% or less, or 80% or less. As long as the above requirements are satisfied, it is not necessary to individually specify the volume percentage of each of the martensite and the bainite.

The martensite may be either fresh martensite or tempered martensite. Further, the volume percentage of the martensite described above is the total volume percentage of the fresh martensite and the tempered martensite. It is not necessary to individually specify the volume percentage of each of the fresh martensite and the tempered martensite. However, the tempered martensite has the effect of further improving the hole expansibility of the steel sheet. Therefore, it is preferable that a part or all of the martensite at the ¼ thickness portion is the tempered martensite. Further, it is preferable that the volume percentage of the tempered martensite at the ¼ thickness portion is 5% or more, 8% or more, or 10% or more. The upper limit of the volume percentage of the tempered martensite is not particularly limited. However, as described above, the upper limit of the total volume percentage of the martensite and the bainite is substantially 92%, and therefore, the upper limit of the volume percentage of the tempered martensite is also substantially 92%, and may be 90% or less, 85% or less, or 80% or less.

In the steel sheet according to the present embodiment, the metallographic structure at the thickness ¼ portion further includes the residual austenite. The residual austenite improves the strength-ductility balance of the steel sheet by the TRIP effect. The strength-ductility balance is a mechanical property that is evaluated by the product of tensile strength and elongation of a steel sheet. In order to obtain these effects, the volume percentage of the residual austenite is set to 8% or more. The volume percentage of the residual austenite at the ¼ thickness portion may be 8.5% or more, 9% or more, or 10% or more. The upper limit of the volume percentage of the residual austenite at the ¼ thickness portion is not particularly limited. However, it may be set to, for example, 20%, 18%, or 15%.

All the metallographic structures at the ¼ thickness portion of the steel sheet according to the present embodiment may be the martensite, the bainite, and the residual austenite. That is, the total volume percentage of the martensite, the bainite, and the residual austenite is 100% at the ¼ thickness portion, and a remainder does not need to be present. On the other hand, one or both of ferrite and pearlite may be included in the steel sheet as a remainder of the metallographic structure at the ¼ thickness portion. The amounts of ferrite and pearlite are not particularly limited. However, considering the above requirements for the martensite, the bainite, and the residual austenite, the total volume percentage of one or both of the ferrite and the pearlite is up to 42% at the ¼ thickness portion. The total volume percentage of one or both of the ferrite and the pearlite at the ¼ thickness portion may be 40% or less, 38% or less, or 35% or less. Since AlN is ignored in the evaluation of the volume percentage of the metallographic structure, AlN is regarded as not being included in the remainder of the metallographic structure. Further, in the evaluation of the metallographic structure, bainitic ferrite is regarded as a part of the bainite described above, not the ferrite of the remainder.

Further, in the steel sheet according to the present embodiment, the average value of the aspect ratios of prior austenite grains at the ¼ thickness portion is 5.0 or more. The prior austenite refers to a structure that was austenite at a step of manufacturing a steel sheet, but was finally transformed into martensite, bainite, or the like. By observing the metallographic structure of the finally obtained steel sheet, it is possible to confirm a prior austenite grain boundary which is a trace of the prior austenite. On the other hand, the residual austenite described above is austenite that finally remains in the steel sheet. Therefore, it is necessary to distinguish between the prior austenite and the residual austenite. The aspect ratio of the prior austenite grain is a value that is obtained by dividing a major axis of a rectangle that approximates a region surrounded by the prior austenite grain boundary (that is, the prior austenite grain) by a minor axis. The average value of the aspect ratios of the prior austenite grains is the average value of the each aspect ratios of all the martensite grains and the bainite grains in the measurement visual field.

The larger the average aspect ratio of the prior austenite grains at the ¼ thickness portion, the greater the ductility of the steel sheet becomes, and the strength-ductility balance increases. The average aspect ratio of the prior austenite grains at the ¼ thickness portion may be 5.5 or more, 6.0 or more, or 7.0 or more. The upper limit of the average aspect ratio of the prior austenite grains at the ¼ thickness portion is not particularly specified. However, it may be set to, for example, 12.0, 11.0, 10.0, or 9.0.

(C) Number Density of AlN at the Depth Position of 30 μm from the Surface (Sheet Surface) of the Steel Sheet Next, the number density of AlN at the depth position of 30 μm from the surface (sheet surface) of the steel sheet according to the present embodiment will be described. In a case where the steel sheet includes a surface-treated layer such as plating, the sheet surface means the boundary surface between the surface-treated layer and a base steel sheet, that is, the surface of the base steel sheet.

Number Density of AlN is 3000 Pieces/mm² or More and Less than 6000 Pieces/mm² at the Depth Position of 30 μm from the Surface of the Steel Sheet If the number density of AlN at the depth position of 30 μm from the surface of the steel sheet is 3000 pieces/mm² or more, the hole expansion rate of the steel sheet increases. It is presumed that this is because AlN exerts a pinning effect to refine the ferrite on the surface layer of the steel sheet and suppress the growth of cracks during hole expansion processing. Therefore, in the steel sheet according to the present embodiment, the number density of AlN at the depth position of 30 μm from the surface of the steel sheet is set to 3000 pieces/mm² or more. The number density of AlN at the depth position of 30 μm from the surface of the steel sheet may be set to 3200 pieces/mm² or more, 3300 pieces/mm² or more, or 3500 pieces/mm² or more.

However, if the number density of AlN at the depth position of 30 μm from the surface of the steel sheet is excessive, the hole expansibility and the strength-ductility balance of the steel sheet are impaired. It is presumed that this is because an excessive amount of AlN promotes the occurrence of cracks when stress or deformation is applied to the steel sheet. Therefore, the number density of AlN at the depth position of 30 μm from the surface of the steel sheet is set to less than 6000 pieces/mm². The number density of AlN at the depth position of 30 μm from the surface of the steel sheet may be set to 5900 pieces/mm² or less, 5800 pieces/mm² or less, or 5500 pieces/mm² or less.

(D) Internal Oxidation Layer of the Steel Sheet

Next, the internal oxidation layer of the steel sheet according to the present embodiment will be described. The internal oxidation layer is a layer in which at least a part of the crystal grain boundary of the base metal is coated with an oxide of an easily oxidizable element such as Si or Mn. By coating the crystal grain boundary with an oxide, it becomes possible to suppress the invasion of molten metal into the crystal grain boundaries and suppress the LME cracking during welding.

The Steel Sheet Has The Internal Oxidation Layer, In Which At Least A Part Of A Crystal Grain Boundary Is Coated With An Oxide, From The Sheet Surface To The Depth Of 5.0 μM Or More The internal oxidation layer suppresses the LME cracking. This is because the internal oxide that coats at least a part of the crystal grain boundary in the internal oxidation layer suppresses the invasion of molten zinc into the crystal grain boundary during welding of the steel sheet. However, if the thickness of the internal oxidation layer is insufficient, the effect of suppressing the LME cracking becomes insufficient. Therefore, in the steel sheet according to the present embodiment, the internal oxidation layer needs to be formed so as to extend from the sheet surface to the depth of 5.0 μm or more. The internal oxidation layer may be formed so as to extend from the sheet surface to the depth of 5.5 μm or more, 5.8 μm or more, or 6.0 μm or more. The upper limit of the existence depth of the internal oxidation layer is not particularly specified. However, it may be set to, for example, 8.0 μm, 7.5 μm, or 7.0 μm.

The Grain Boundary Coverage of the Oxide is 60% or More in a Region from the Sheet Surface to the Depth of 5.0 μm The grain boundary coverage of the oxide in the internal oxidation layer also affects the LME cracking resistance. The grain boundary coverage is a ratio (%) of the length of the crystal grain boundary coated with the oxide to the total length of the crystal grain boundary in the region described above. Even if the internal oxidation layer is formed from the sheet surface to the depth of 5.0 μm or more, if the amount of internal oxide disposed in the internal oxidation layer is insufficient, the effect of suppressing the LME cracking becomes insufficient. Therefore, in the steel sheet according to the present embodiment, the grain boundary coverage of the oxide in the region from the sheet surface to the depth of 5.0 μm is set to 60% or more. In this way, the LME cracking can be sufficiently suppressed. The grain boundary coverage of the oxide in the region from the sheet surface to the depth of 5.0 μm may be set to 62% or more, 65% or more, or 70% or more.

The upper limit of the grain boundary coverage of the oxide is not particularly specified. However, for example, in the region from the sheet surface to the depth of 5.0 μm, the grain boundary coverage of the oxide may be set to 80% or less, 78% or less, or 75% or less. Further, there is a case where the internal oxidation layer extends from the sheet surface to the depth exceeding 5.0 μm. However, the internal oxidation layer does not need to specify the grain boundary coverage of the oxide at the depth exceeding 5.0 μm from the sheet surface.

(D) Strength of the Steel Sheet

Tensile Strength is 980 MPa or More

The tensile strength of the steel sheet according to the present embodiment is 980 MPa or more. In this way, the steel sheet according to the present embodiment can be suitably used as a material for a member requiring high strength, for example, a vehicle member. The tensile strength may be 1000 MPa or more, 1020 MPa or more, or 1050 MPa or more. The upper limit of the tensile strength is not particularly specified. However, it may be set to, for example, 1300 MPa or less.

The steel sheet according to the present embodiment may further have galvanizing or hot-dip galvannealing. These platings improve the corrosion resistance of the steel sheet. Further, since the steel sheet according to the present embodiment has the internal oxidation layer, even if, for example, galvanizing or hot-dip galvanizing is disposed on the surface of the steel sheet, it is extremely difficult for LME cracking to occur.

However, the steel sheet according to the present embodiment does not need to have a galvanized or hot-dip galvannealed steel sheet. The LME cracking occurs not only in a steel sheet having galvanizing or hot-dip galvannealing, but also in non-plated steel sheets that are superimposed and welded in contact with the galvanizing or the hot-dip galvannealing. Therefore, the steel sheet according to the present embodiment can exert the effect thereof even in a case where it does not have galvanizing or hot-dip galvannealing.

Next, a method for measuring the features of the steel sheet described above will be described in detail below.

The evaluation of the chemical composition of the steel sheet needs to be performed in a region excluding the internal oxidation layer of the steel sheet. This is because, in the internal oxidation layer, there is a case where the chemical composition changes due to oxidation and decarburization. Therefore, the chemical composition of the steel sheet is measured in the range of ⅛ to ⅜ of the sheet thickness centered on ¼ of the sheet thickness. The evaluation conditions for the chemical composition other than the measurement position are not particularly limited, and a known method can be appropriately used. In a case where the chemical composition of a slab that is used as the material of the steel sheet is known, the chemical composition of the slab may be regarded as the chemical composition of the steel sheet.

The amount (volume percentage) of the martensite at the ¼ thickness portion is obtained by the following procedure. An observed section of a sample is etched with a repeller liquid. Then, a region of 100 μm×100 μm within the range of ⅛ to ⅜ of the sheet thickness centered on ¼ of the sheet thickness is observed at a magnification of 3000 times by using a Field Emission Scanning Electron Microscope (FE-SEM). The observation is performed at five locations. Since the martensite and the residual austenite are not corroded in repeller corrosion, the area ratio of an uncorroded region is the total area ratio of the martensite and the residual austenite. Further, the total area ratio of the martensite and the residual austenite can be regarded as the total volume percentage of them. The volume percentage of the martensite in each observed visual field is calculated by subtracting the volume percentage of the residual austenite measured by a method, which will be described later, from the area ratio (that is, the volume percentage) of the uncorroded region. Then, the average value of the martensite volume percentage in each of the observed visual fields at the five locations is regarded as the amount of the martensite at the ¼ thickness portion of the steel sheet.

The amount (volume percentage) of the tempered martensite at the ¼ thickness portion is obtained by the following procedure. An observed section of a sample is etched with a Nital reagent. Then, a region of 100 μm×100 μm within the range of ⅛ to ⅜ of the sheet thickness centered on ¼ of the sheet thickness is observed at a magnification of 3000 times by using the FE-SEM. The observation is performed at five locations. From the position of cementite that is included within the structure and the arrangement of the cementite, it can be determined whether or not the crystal grains that are included in a visual field are tempered martensite. Specifically, in the tempered martensite, the cementite is present inside a martensite lath. However, since the crystal orientations of the martensite lath and the cementite are two or more and the cementite has a plurality of variants, the tempered martensite can be identified. This area ratio is obtained, and the average value of the volume percentage of the tempered martensite in each of the observed visual fields at the five locations is regarded as the amount of the tempered martensite at the ¼ thickness portion of the steel sheet.

The amount (volume percentage) of the bainite at the ¼ thickness portion is obtained by the following procedure. An observed section of a sample is etched with a Nital reagent. Then, a region of 100 μm×100 μm within the range of ⅛ to ⅜ of the sheet thickness centered on ¼ of the sheet thickness is observed at a magnification of 3000 times by using the FE-SEM. The observation is performed at five locations. As the existence state of the bainite, there is a case where cementite or residual austenite is present at an interface of lath-shaped bainitic ferrite, or a case where cementite is present inside the lath-shaped bainitic ferrite. In a case where the cementite or the residual austenite is present at the interface of the lath-shaped bainitic ferrite, since the interface of the bainitic ferrite is known, the bainite can be identified. Further, in a case where the cementite is present inside the lath-shaped bainitic ferrite, since the crystal orientation relationship between the bainitic ferrite and the cementite is one type and the cementite has the same variant, the bainite can be identified. This area ratio is obtained, and the average value of the volume percentage of the bainite in each of the observed visual fields at the five locations is regarded as the amount of the bainite at the ¼ thickness portion of the steel sheet.

The volume percentage of the residual austenite can be calculated by measurement using an X-ray diffractometer. In the measurement using an X-ray diffractometer, first, the region from the sheet surface (rolled surface) of a sample to the plane at the depth of ¼ of the sheet thickness is removed by mechanical polishing and chemical polishing. Next, in the plane at the depth of ¼ of the sheet thickness t, the integrated strength ratios of the diffraction peaks of (200) and (211) of a bcc phase and (200), (220), and (311) of a fcc phase are obtained by using MoKa rays as characteristic X-rays, and the volume percentage of the residual austenite can be calculated based on these integrated strength ratios.

Further, in order to distinguish between the martensite grain and the residual austenite grain in the observed visual field in which the amount of the martensite is specified, crystal orientation analysis using backscattered electrons (SEM-EBSD) is performed. First, a sample for microstructure observation is collected from the steel sheet such that the structure of a sheet thickness cross section can be observed. Next, a steel sheet 1 that is a sample is embedded in a resin R. In the sample after collection, the surface parallel to a rolling direction and perpendicular to the sheet thickness is wet-polished with emery paper, and further, buffing using diamond abrasive grains having an average diameter of 1 μm is performed to finish the observed section to a mirror surface. Subsequently, colloidal silica polishing using a suspension liquid using alcohol as a solvent is performed in order to eliminate strain introduced into the polished surface due to the mechanical polishing described above. In the colloidal silica polishing, if the loading of a load increases during polishing, strain may be further introduced, and therefore, it is important to suppress the load during polishing. Therefore, in the polishing with colloidal silica, automatic polishing for 1 hour at an output set to 40% may be performed using Vibromet 2 manufactured by BUEHLER.

In the sample adjusted by the above procedure, five observed visual fields in which the amount of the martensite is specified are observed by SEM-EBSD, and crystal orientation data of F. C. C.-iron is obtained. The magnification of the observation is set to 3000 times. Further, the measurement interval (STEP) may be set to a magnification in a range of 0.01 to 0.1 μm, and 0.05 μm may be selected. In the crystal orientation MAP data of F. C. C.-iron obtained under the measurement conditions, a region where a confidence value (CI value) is less than 0.1 is excluded, and a region surrounded by a boundary where a crystal orientation difference is 15° or more is defined as the residual austenite grain. Further, the structure grains of the martensite can also be specified from the specified residual austenite grains and the structure grains of the martensite and the residual austenite specified by the structure observations at the five locations described above.

The average value of the aspect ratios of the prior austenite grains at the ¼ thickness portion is obtained by the following procedure. First, the area of each of the structure grains of the martensite and the bainite specified by the structure observations at the five locations described above is measured. Next, the prior austenite grain boundary which includes the martensite and the bainite is specified, and the major axis of the prior austenite grain boundary is measured. Here, the major axis is the maximum length of a line segment connecting two points on the circumference of the prior austenite grain boundary. Subsequently, in each prior austenite grain, the value obtained by dividing the total value of the areas of the martensite and the bainite which are included in each prior austenite grain boundary by the major axis is regarded as the minor axis of each prior austenite. Finally, for each prior austenite grain included in all the observed visual fields at the five locations, the ratio of the major axis to the minor axis, that is, the aspect ratio, is calculated, and the average value thereof is obtained.

The number density of AlN at the depth position of 30 μm from the surface of the steel sheet is measured by the following procedure. First, the steel sheet is cut perpendicular to the sheet surface so as to follow a rolling direction. Next, a sample in which a region of 10 μm×10 μm can be observed is collected from a depth position A of 30 μm from the surface of the steel sheet by FIB (Focused Ion Beam) processing, and ten thin film samples each having a thickness of 100 nm or more and 300 nm or less are made. Thereafter, with respect to the sample at the depth position A, the element mapping of Al and N of the thin film sample is created in the range of 10 μm×10 μm at a magnification of 9000 times by using a field emission transmission electron microscope and EDS therein (Energy Dispersive X-ray Analysis). In a place where AlN precipitates, the number of detected Al and N is remarkably high as compared with a place where AlN does not precipitate, and therefore, a region where the number of detected Al and N is high is determined to be AlN. By counting the number of AlNs which are included in all the ten thin film samples and dividing this number by the total observation area, the number density of AlN at the position A can be obtained.

The existence depth of the internal oxidation layer and the grain boundary coverage by the oxide in the internal oxidation layer are obtained by the following method. Crystal orientation analysis (SEM-EBSD) by a scanning electron microscope (SEM) and backscattered electrons is used to observe the structure. First, a sample for microstructure observation is collected from the steel sheet such that the structure of a sheet thickness cross section can be observed. Next, a steel sheet 1 that is a sample is embedded in a resin R. In the sample after collection, the surface parallel to a rolling direction and perpendicular to the sheet thickness is wet-polished with emery paper, and further, buffing using diamond abrasive grains having an average diameter of 1 μm is performed to finish the observed section to a mirror surface. Subsequently, colloidal silica polishing using a suspension liquid using alcohol as a solvent is performed in order to eliminate strain introduced into the polished surface due to the mechanical polishing described above. In the colloidal silica polishing, if the loading of a load increases during polishing, strain may be further introduced, and therefore, it is important to suppress the load during polishing. Therefore, in the polishing with colloidal silica, automatic polishing for 1 hour at an output set to 40% may be performed using Vibromet 2 manufactured by BUEHIER. However, if electrolytic polishing, chemical etching, or the like is applied in the process of eliminating strain introduced by mechanical polishing, the oxide melts, so that the actual state of the oxide existing on the grain boundary cannot be grasped by observation. Further, the same caution is required even in a case where polishing with water as a solvent is performed, and a water-soluble oxide dissolves during the polishing with water as a solvent, so that the internal oxide on the grain boundary cannot be observed. Therefore, in the polishing finish process, it is necessary to adopt a process that does not include the above procedure.

The surface layer of the sample adjusted by the above procedure is observed by SEM and SEM-EBSD. As the observation magnification, among magnifications of 1000 to 9000 times, a magnification in which 10 or more ferrite crystal grains in the microstructure are included is selected, and, for example, 3000 times is selected.

Figure 2A:
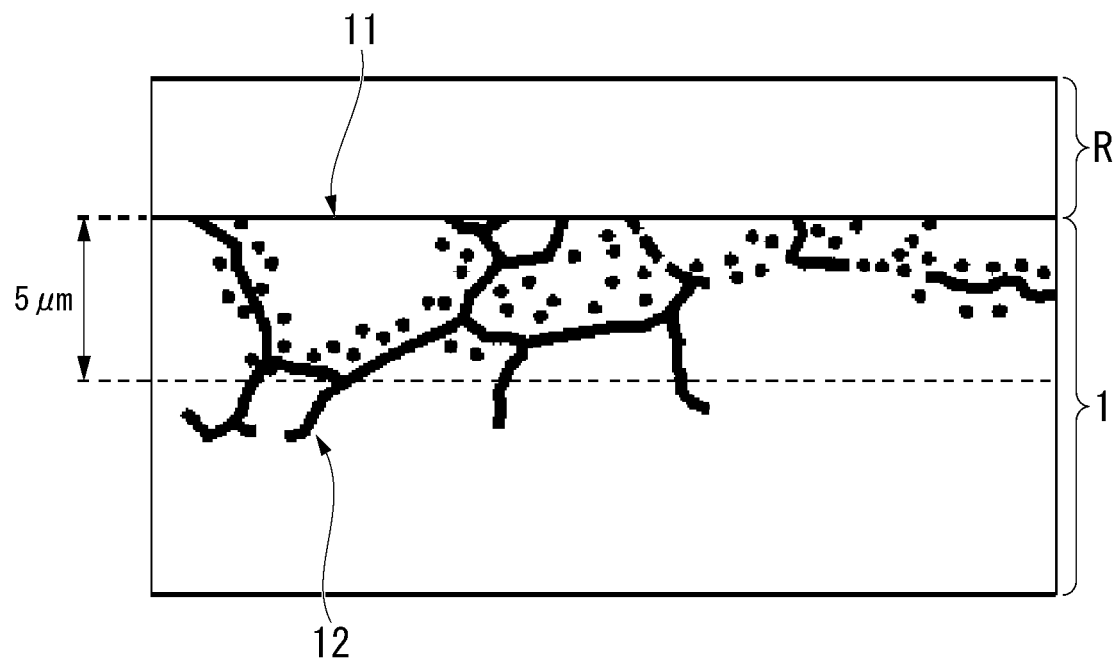
FIG. 2A is a schematic diagram of a grain boundary oxide in a steel surface layer taken by an SEM-reflected electron image in a process of calculating grain boundary coverage.

First, an oxide existing at a crystal grain boundary 13, that is, a grain boundary oxide 12, is confirmed by the reflected electron image of the SEM shown in FIG. 2A. In the reflected electron image, a color tone changes depending on the atomic number (or mass), so that the grain boundary oxide 12 and the steel structure can be easily distinguished. Then, in the structure observation of the reflected electron image, for example, in a case where a state where the atomic number (or mass) is small is set to be displayed in a "black color tone", an oxide having a small mass with respect to iron is displayed in a black color tone in the observation image (refer to FIG. 2A). The thickness of the internal oxidation layer can be determined by measuring how deep the grain boundary oxide 12 included in this observation image extends from the surface of the steel sheet 1, that is, a sheet surface 11. In a case where the grain boundary oxide 12 extends from the sheet surface 11 to the depth of 5.0 μm or more in a part of the observed visual field, the steel sheet 1 is regarded as having an internal oxidation layer in which at least a part of the crystal grain boundary 13 is coated with an oxide from the sheet surface 11 to the depth of 5.0 μm or more. Further, for the subsequent measurement of the grain boundary coverage, the structures of the surface layer of the steel sheet 1 in five visual fields are photographed under this observation conditions to confirm the existence state of the grain boundary oxide 12.

Subsequently, at the same position as the visual field observed by the SEM-reflected electron image described above, crystal orientation data of B. C. C.-iron is obtained by SEM-EBSD. The measurement magnification may be any one selected the magnifications from 1000 to 9000 times, and may be the same as, for example, the magnification in the observation of the SEM-reflected electron image described above. Further, the measurement interval (STEP) may be set to a magnification in a range of 0.01 to 0.1 μm, and 0.05 μm may be selected.

In the crystal orientation MAP data of B. C. C.-iron obtained under this measurement conditions, a region where a confidence value (CI value) is less than 0.1 is excluded, and a boundary where the crystal orientation difference is 15° or more is defined as the crystal grain boundary 13. The CI value is a numerical value that is an index of the reliability of crystal orientation determination shown in analysis software, and it is generally considered that the reliability is low when the value is less than 0.1.

In a case where an oxide is present at the crystal grain boundary 13 of ferrite, since the crystal orientation data of B. C. C.-iron is not obtained, many regions having the CI value of less than 0.1 are present between the crystal grains adjacent to each other. In this case, although the crystal grain boundary 13 cannot be clearly confirmed, at the boundary where the orientation difference between ferrite crystal grains adjacent to each other is 15° or more, the crystal grain boundary is drawn on the MAP so as to pass through the center of the region where the CI value is less than 0.1.

Figure 2B:
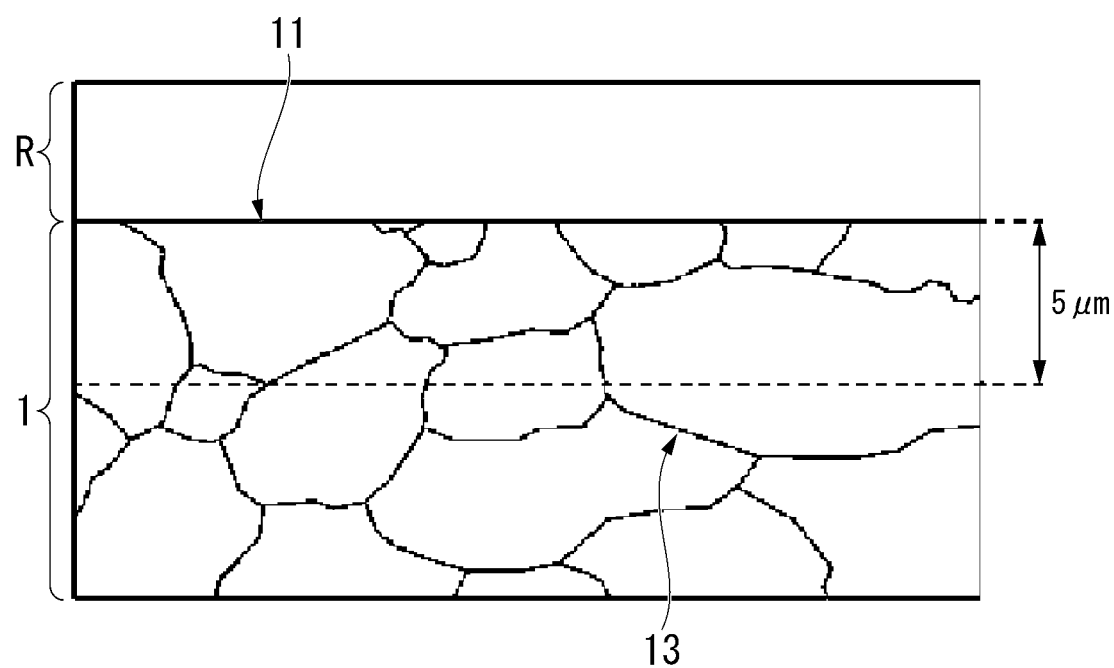
FIG. 2B is a schematic diagram of a crystal grain boundary MAP having a crystal orientation difference of 15° or more at the same position as in FIG. 2A.
Figure 2C:
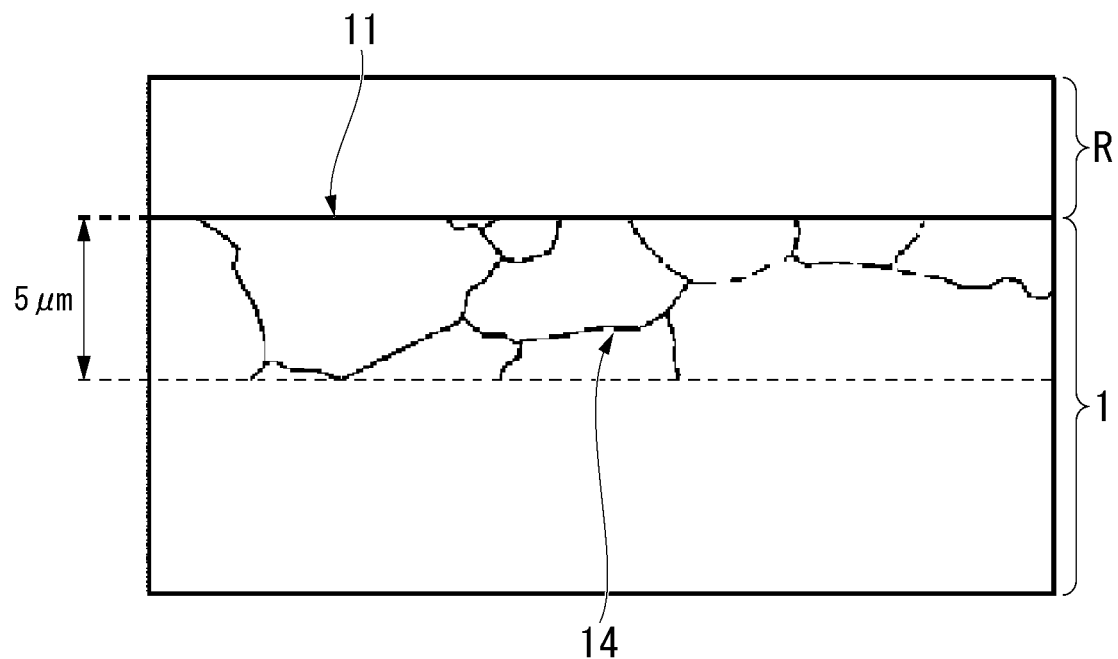
FIG. 2C is a schematic diagram showing a portion coated with an oxide at a crystal grain boundary at the same position as in FIG. 2A.
Figure 2D:
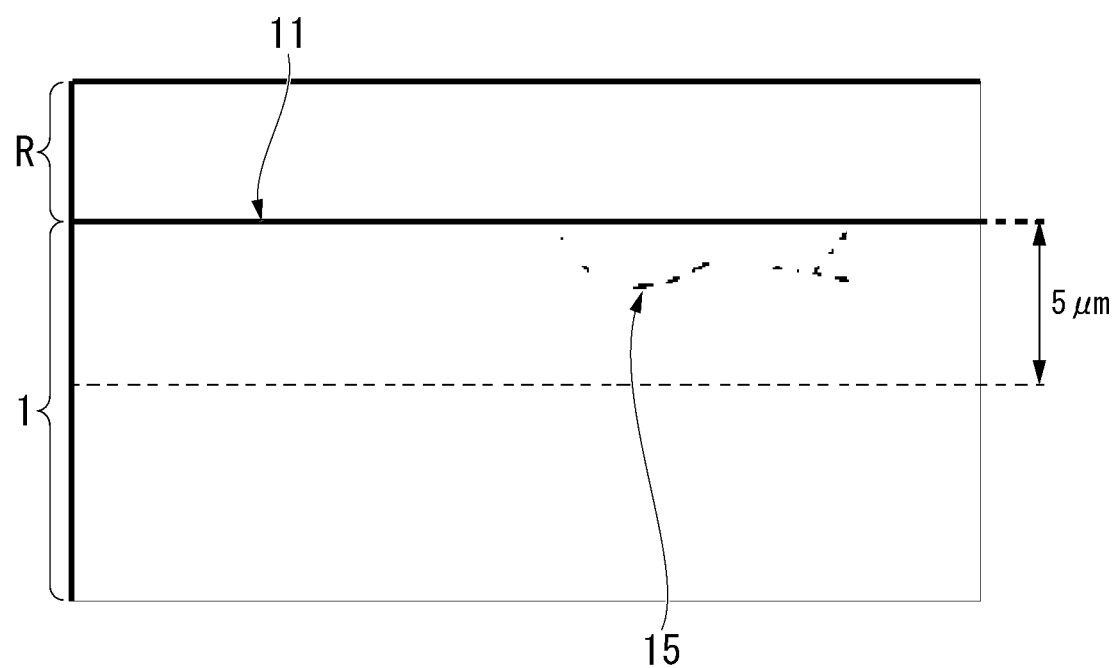
FIG. 2D is a schematic diagram showing a portion which is not coated with an oxide at the same position as FIG. 2A.

In the ferrite crystal grain boundary MAP (refer to FIG. 2B) obtained by the above procedure, as shown in FIG. 2C, the length of a coated grain boundary 14 which is a crystal grain boundary coated with an oxide is measured. Subsequently, as shown in FIG. 2D, the length of an uncoated grain boundary 15 which is a crystal grain boundary that is not coated with an oxide is measured. Then, the grain boundary coverage (%) is calculated by dividing the length of the obtained coated grain boundary 14 by the lengths of all the crystal grain boundaries.

The tensile strength of the steel sheet is measured by collecting a JIS No. 5 tensile test piece described in JIS Z 2201: 1998 from the steel sheet in a direction perpendicular to the rolling direction and performing a tensile test in accordance with JIS Z 2241: 2011.

Next, a suitable example of a method for manufacturing a steel sheet according to the present embodiment will be described. According to this manufacturing method, the steel sheet according to the present embodiment can be obtained. However, the manufacturing method described below does not limit the range of the steel sheet according to the present embodiment. A steel sheet satisfying the requirements described above is regarded as the steel sheet according to the present embodiment regardless of the manufacturing method thereof.

The method for manufacturing a steel sheet according to the present embodiment includes a step of obtaining a slab by continuously casting molten steel having components of the steel sheet according to the present embodiment by using a vertical bending type continuous casting machine, a step of obtaining a steel sheet by hot-rolling the slab, a step of coiling the steel sheet after the hot rolling, a step of cold-rolling the steel sheet after the coiling, and a step of annealing the steel sheet after the cold rolling. In the continuous casting, bending strain which is applied to the slab is set to be in a range of 0.5 to 2.0%, and the average cooling rate of the slab while the slab is being bent is set to be in a range of 0.5 to 10° C./sec. In the hot rolling, the finish rolling finishing temperature is set to 850° C. or higher. In the coiling, the coiling temperature of the steel sheet is set to 500° C. or lower. In the cold rolling, the cold rolling ratio of the steel sheet is set to be in a range of 0 to 20%. In the annealing, the steel sheet is heated to a temperature range of (Ac3 point-100)° C. or higher and 900° C. or lower in an atmosphere having an oxygen potential of −1.50 or higher, and then cooled to a temperature range of (Ms point-100)° C. or higher and Bs point or lower at an average cooling rate in a range of 10 to 50° C./sec, and further held for a time in a range 10 to 600 seconds in a temperature range of (Ms point-100)° C. or higher and Bs point or lower.

First, molten steel is continuously cast to obtain a slab. Here, the slab is cooled while applying an appropriate bending strain to the slab. The inventors of the present invention have found that the bending strain applied to the slab promotes the precipitation of AlN on the surface of the slab. AlN precipitated on the surface of the slab remains on the surface of the steel sheet which is obtained by rolling the slab, and modifies the surface of the steel sheet in annealing (described later). Here, the "bending strain" is a general parameter indicating the degree of bending deformation of a sheet material, and is strain c at the ¼ thickness portion, which is explained in "Deformation processing that is understood from the foundation (revised edition)" of Shuji Nagata et al. p. 74 to 75, Corona Publishing Co., Ltd., 1997. The strain ε during continuous casting can be calculated by the following expression described in the same document.

$$\varepsilon = (r - Rn)/(Rn) = y/Rn$$

Rn is the radius of curvature of a neutral surface of the cast piece, and in the continuous casting, it is a bend radius of a continuous casting apparatus. r is the radius of curvature of the surface separated by y from the neutral surface. In calculating the strain ε at the ¼ thickness portion, the value obtained by dividing the sheet thickness of the cast piece by 2 may be substituted for y.

Specific conditions for the continuous casting will be described below. First, the continuous casting is performed using a vertical bending type continuous casting machine. In the vertical bending type continuous casting, the molten steel is solidified by cooling it by a plurality of rows of cooling segments while pulling out it in the vertical direction. When the solidification of the molten steel is completed, the slab is bent in the horizontal direction and guided in the horizontal direction by using a roller. At this time, the bending strain of the slab is set to be in a range of 0.5 to 2.0%, and the average cooling rate of the slab while the slab is being bent is set to be in a range of 0.5 to 10° C./sec. The average cooling rate of the slab while the slab is being bent is a value obtained by dividing the difference between the surface temperature of the slab at the point in time of the start of bending the slab and the surface temperature of the slab at the point in time of the end of bending the slab by a bending time.

When the slab is bent, tensile strain is applied to one surface of the slab and compressive strain is applied to the other surface. In a case where the slab is bent while cooling the slab at a predetermined cooling rate, both the tensile strain and the compressive strain promote the precipitation of AlN in the slab. In the slab manufactured under the conditions described above, the nucleation of AlN is promoted to form fine AlN, and the slab has a large number of AlNs in the surface layer thereof. However, if the average cooling rate of the slab while the slab is being bent is excessive or the bending strain of the slab is excessive, the number density of AlN at the depth position of 30 μm from the surface of the steel sheet becomes excessive, so that ductility and hole expansibility are impaired.

Next, the slab is hot-rolled to obtain a steel sheet. At the time of the hot rolling, the finish rolling finishing temperature, that is, the surface temperature of the steel sheet when the steel sheet comes out from the final pass of the hot rolling machine, is set to 850° C. or higher. In this way, the structure of the steel sheet after the hot rolling becomes an acicular structure. By annealing the steel sheet having an acicular structure, the aspect ratio of the prior austenite grain of the steel sheet after the annealing can be increased.

Next, the steel sheet after the hot rolling is coiled. The coiling temperature is set to 500° C. or lowers. In this way, the structure of the steel sheet after the hot rolling is maintained as an acicular structure. If the coiling temperature is too high, ferrite and/or pearlite having a small aspect ratio is formed in the coiled steel sheet, and the proportion of the acicular structure in the steel sheet decreases. By annealing the steel sheet having an acicular structure, the aspect ratio of the prior austenite grain of the steel sheet after the annealing can be increased.

The coiled steel sheet may be cold rolled. However, the cold rolling ratio is set to 20% or less. This is because a large amount of dislocations are included in the steel sheet cold-rolled at a high cold rolling ratio. If a steel sheet with a large amount of dislocations is heated for annealing, the dislocations promote recrystallization of the structure of the steel sheet, and the proportion of the acicular structure in the steel sheet decreases. Therefore, in the method for manufacturing a steel sheet according to the present embodiment, the cold rolling ratio is limited to 20% or less to prevent an excessive amount of dislocations from being introduced into the steel sheet and increase the aspect ratio of the prior austenite grain of the steel sheet after annealing. The smaller the cold rolling ratio, the more preferable. In the method for manufacturing a steel sheet according to the present embodiment, it is also allowed that the cold rolling is omitted, that is, the cold rolling ratio is set to 0%.

Next, the steel sheet is annealed after the cold rolling. As described above, the steel sheet does not need to be cold rolled. However, for convenience, the steel sheet to be annealed is referred to as a "steel sheet after the cold rolling". In the annealing, the steel sheet is heated and then cooled. An internal oxidation layer is formed on the surface of the steel sheet when the steel sheet is heated, and the metallographic structure of the steel sheet is controlled when the steel sheet is cooled.

The heating of the steel sheet is performed to a temperature range of (Ac3 point −100)° C. or higher and 900° C. or lower. Here, the oxygen potential of the atmosphere for heating the steel sheet is set to −1.50 or higher. Preferably, the oxygen potential is set to −1.25 or higher, −1.00 or higher, or −0.75 or higher. In this way, it is possible to form an internal oxidation layer with sufficient thickness and oxide to prevent LME. The oxygen potential of the atmosphere for heating the steel sheet is the common logarithm of a value obtained by dividing water vapor partial pressure $P_{H2O}$ in the atmosphere by hydrogen partial pressure $P_{H2}$, that is, $\log_{10}(PH_{2O}/P_{H2})$.

If a normal steel sheet is heated in such an atmosphere, the surface layer of the steel sheet is decarburized, coarse ferrite is formed here, and the hole expansibility of the steel sheet is impaired. However, in the method for manufacturing a steel sheet according to the present embodiment, a large amount of AlNs are precipitated to the surface layer of the steel sheet before heating. These AlNs exert pinning effect to suppress the coarsening of crystal grains in the surface layer of the steel sheet and improve the hole expansibility of the steel sheet.

Further, if the steel sheet is heated in the atmosphere described above, the uniform elongation of the steel sheet further increases. The uniform elongation is a limit value of permanent elongation in which a parallel portion of a test piece is deformed almost uniformly in a tensile test. Although the reason why the uniform elongation is increased is not clear, the inventors of the present invention presume that if the steel sheet is heated in the atmosphere described above, Al is segregated to the grain boundary of the surface layer and AlN becomes coarse. The uniform elongation of the steel sheet is preferably 5% or more and 22% or less. A more preferable lower limit is 7% or more or 10% or more, and a more preferable upper limit is 20% or less or 18% or less.

The Ac3 point is calculated by the following expression.

$$Ac3(°C.)=910-203\times C^{1/2}+44.7\times Si-30\times Mn+700\times P-20\times Cu-15.2\times Ni-11\times Cr+31.5\times Mo+400\times Ti+104\times V+120\times Al$$

Here, C, Si, Mn, P, Cu, Ni, Cr, Mo, Ti, V, and Al are the contents [mass %] of each element contained in the slab.

Subsequently, the steel sheet is cooled at an average cooling rate in a range of 10 to 50° C./sec to a cooling stop temperature in the temperature range of (Ms point-100)° C. or higher and Bs point or lower, and the temperature of the steel sheet is held in this temperature range. The retention time of the steel sheet in the temperature range of (Ms point-100)° C. or higher and Bs point or lower is in a range of 10 to 600 seconds.

The Ms point is a temperature at which martensite begins to be formed during quenching cooling. In the manufacturing method according to the present embodiment, a value that is calculated by the following expression is regarded as the Ms point.

$$Ms=541-474\times C/(1-S\alpha/100)-15\times Si-35\times Mn-17\times Cr-17\times Ni+19\times Al$$

The Bs point is a temperature at which bainitic transformation starts during cooling after quenching. In the manufacturing method according to the present embodiment, a value that is calculated by the following expression is regarded as the Bs point.

$$Bs=820-290\times C/(1-Sa)-37\times Si-90\times Mn-65\times Cr-50\times Ni+70\times Al$$

Here, the element symbols included in the Ms calculation formula and the Bs calculation formula indicate the amount (unit mass %) of each element contained in the steel sheet. The symbol $S\alpha$ included in the formula is a ferrite fraction (unit volume %) of the steel sheet at the point in time when the heating for quenching is ended.

It is difficult to determine the area ratio of ferrite in a steel sheet which is being manufactured. Therefore, a steel sheet having a temperature history similar to that of the actual steel sheet manufacturing process is prepared in advance, the area ratio of ferrite in the steel sheet center portion of the steel sheet is obtained, and the area ratio of the ferrite is used for calculating Ms and Bs. The ferrite fraction of the steel sheet largely depends on the heating temperature for quenching. Therefore, when examining the cooling conditions, it is possible to specify the Sa by first determining the manufacturing conditions of the step before cooling, manufacturing the steel sheet under the manufacturing conditions, and measuring the ferrite fraction of the steel sheet.

The area ratio of ferrite can be obtained as follows. First, a sample having a sheet thickness cross section parallel to the rolling direction of the steel sheet is collected, and the cross section is defined as an observed section. Of this observed section, a region of 100 μm×100 μm centered at the position of ¼ of the sheet thickness from the surface of the steel sheet is defined as an observation region. An electron channeling contrast image that can be seen by observing the observation region at a magnification of 3000 with a scanning electron microscope is an image that displays the crystal orientation difference of crystal grains as a difference in contrast. In the electron channeling contrast image, a portion having a uniform contrast is ferrite. Then, the area ratio of the ferrite that is identified in this way is calculated by a point counting method (based on ASTM E562).

The average cooling rate is a value obtained by dividing the difference between the surface temperature of the steel sheet at the point in time of the start of cooling and the surface temperature of the steel sheet at the point in time of the end of cooling (that is, a cooling stop temperature) by a cooling time. For example, in a case where annealing and temperature holding (described later) are performed using a furnace, the point in time when cooling is started is the point in time when the steel sheet is taken out from a furnace for annealing, and the point in time when cooling is ended is the point in time when the steel sheet is charged into a furnace for temperature holding.

The retention time of the steel sheet in the temperature range of (Ms point −100)° C. or higher and Bs point or lower means a time during which the surface temperature of the steel sheet is within this temperature range. The temperature of the steel sheet may fluctuate within this temperature range.

By setting the average cooling rate of the steel sheet to a value in a range of 10 to 50° C./sec, it is possible to form a sufficient amount of martensite and/or bainite in the steel sheet. By setting the cooling stop temperature of the steel sheet to a temperature in the temperature range of (Ms point-100)° C. or higher and Bs point or lower, it is possible to create a sufficient amount of residual austenite in the subsequent temperature holding. Further, by setting the retention time of the steel sheet in the temperature range of (Ms point −100)° C. or higher and Bs point or lower to a time in a range of 10 to 600 seconds, it is possible to create a sufficient amount of residual austenite and prevent a decrease in the tensile strength of the steel sheet.

The cooling stop temperature of the steel sheet is preferably (Ms point −100)° C. or higher and 350° C. or lower, more preferably (Ms point −100)° C. or higher and 348° C. or lower, and even more preferably (Ms point −100)° C. or higher and Ms point or lower. In this way, a part or all of martensite that is included in the steel sheet after the completion of annealing can be used as tempered martensite to further enhance the hole expansibility thereof.

The method for manufacturing a steel sheet may further include a step of obtaining a hot-dip galvanized steel sheet by performing galvanizing on the steel sheet after annealing. Further, the method for manufacturing a steel sheet may further include a step of obtaining a hot-dip galvannealed steel sheet by performing galvannealing on the hot-dip galvanized steel sheet. In this case, the temperature holding of the steel sheet described above can be performed by utilizing heat that is applied to the steel sheet during hot-dip galvanizing and galvannealing.

EXAMPLES

The effects of one aspect of the present invention will be described more specifically by way of examples. However, the conditions in the examples are only one condition example adopted for confirming the feasibility and effect of the present invention. The present invention is not limited to this one condition example. The present invention may adopt various conditions as long as the object of the present invention is achieved without departing from the gist of the present invention.

Various steel sheets were manufactured through a step of obtaining a slab by continuously casting molten steel by using a vertical bending type continuous casting machine, a step of obtaining a steel sheet by hot-rolling the slab, a step of coiling the steel sheet after the hot rolling, a step of cold-rolling the steel sheet after the coiling, and a step of annealing the steel sheet after the cold rolling. Various evaluations were performed on these steel sheets. The components of the steel sheets are shown in Table 1-1 and Table 1-2. The manufacturing conditions of the steel sheets are shown in Tables 2-1 to 2-3. The evaluation results of the steel sheets are shown in Table 3-1 and Table 3-2. In any of the steel sheets, a remainder of the metallographic structure at the ¼ thickness portion was ferrite and/or pearlite. Further, the surfaces of Examples 1 to 10 were provided with hot-dip galvanizing, and the surfaces of Examples 11-20 were provided with hot-dip galvannealing.

In these tables, values outside the scope of the invention and values that do not meet pass/fail criteria are underlined. Further, a remainder of alloy components was iron and impurities. In Table 1-1 and Table 1-2, blank cells mean that corresponding elements were not intentionally added.

The methods for evaluating the total amount (volume percentage) of the martensite and the bainite at the ¼ thickness portion of the steel sheet, the amount (volume percentage) of the residual austenite, the aspect ratio of the prior austenite grain at the ¼ thickness portion of the steel sheet, the number density of AlN at the depth position of 30 μm from the surface of the steel sheet, the existence depth of the internal oxidation layer, the grain boundary coverage in the internal oxidation layer, and the tensile strength were as described above. Features other than these were evaluated by the procedure described below.

The elongation of the steel sheet was collected by taking a Japanese Industrial Standard JIS No. 5 test piece from the steel sheet such that the direction perpendicular to the rolling direction and the longitudinal direction of the test piece coincide with each other, and performing a tensile test on the test piece in accordance with JIS Z 2241 (2011). The total elongation that is obtained by this test was regarded as the elongation of the steel sheet.

The hole expansion rate of the steel sheet was obtained by cutting the steel sheet into a size of 100 mm×100 mm and performing a hole expansion test on the test piece in accordance with JIS Z 2256 (2010).

A steel sheet in which a TS×El, which is the product of a tensile strength TS and an elongation El of the steel sheet, is 15000 MPa-% or more was determined to be a steel sheet having an excellent strength-ductility balance. A steel sheet in which a product El×λ of the elongation El and the hole expansion rate λ is 400%.% or more was determined to be a steel sheet having excellent hole expansibility.

The uniform elongation of the steel sheet was obtained by performing a tensile test. A No. 13B test piece was prepared in accordance with JIS Z 2241 (2011), and a tensile test was performed with a tensile axis as the rolling direction of the steel sheet. Tensile test pieces were collected from the position of ¼ of a sheet width in a sheet width direction from an end portion in the sheet width direction, the position of ½ in the sheet width direction from the end portion in the sheet width direction, and the position of ¾ in the sheet width direction from the end portion in the sheet width direction, with a tensile axis as the rolling direction of the steel sheet. The uniform elongation was obtained by calculating the average value of the uniform elongations obtained from these three tensile test pieces.

Figure 3A:
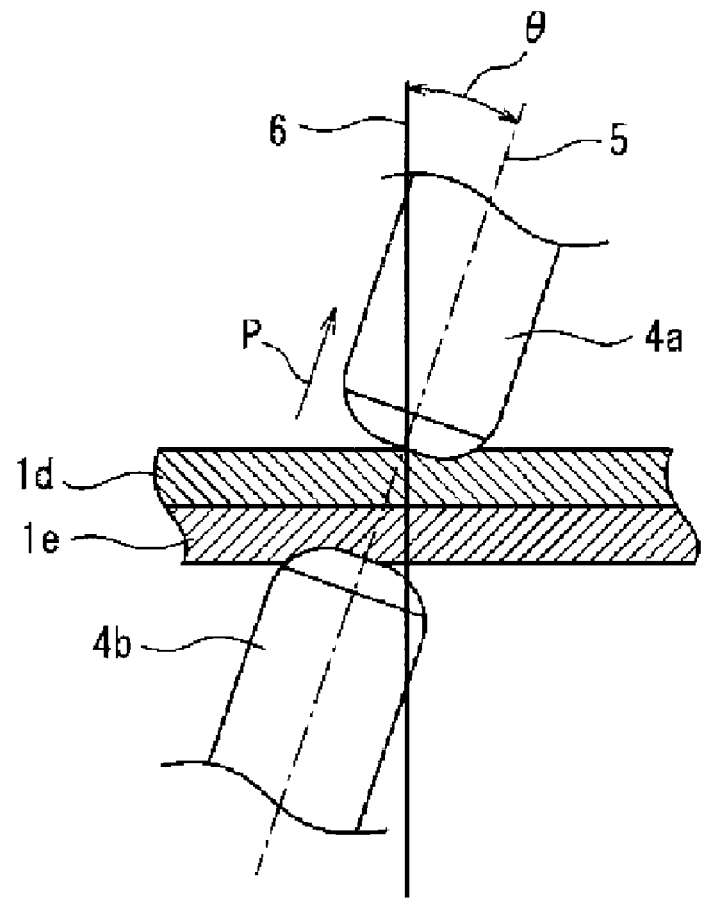
FIG. 3A is a schematic diagram showing an aspect of spot-welding two steel sheets in a test for evaluating liquid metal embrittlement cracking resistance.
Figure 3B:
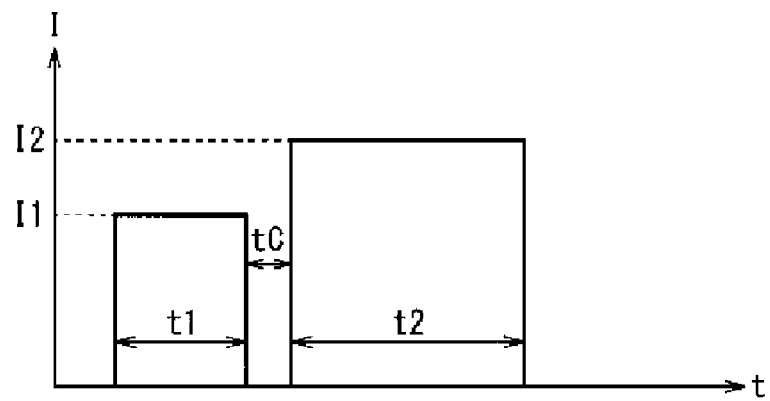
FIG. 3B is a schematic graph showing an aspect of current control when two steel sheets are spot-welded in the test for evaluating liquid metal embrittlement cracking resistance.

The LME resistance of the steel sheet was determined by the following procedure. FIG. 3A shows an aspect of spot-welding two steel sheets, and FIG. 3B shows an aspect of current control when two steel sheets are spot-welded. The vertical axis I of the graph of FIG. 3B is a current value, and the horizontal axis t is time. A steel sheet $1d$ and a steel sheet $1e$ were superimposed and spot-welded with a pair of electrodes $4a$ and $4b$. Welding conditions are as follows.

Electrodes $4a$ and $4b$: DR type electrodes made of Cr—Cu, tip outer diameter: 8 mm, R: 40 mm
  Welding pressure P: 450 kg
  Inclination angle of electrode (angle formed by an electrode centerline 5 and a vertical line 6) θ: 3°
  Upslope: No
  First energization time t1: 0.2 seconds
  Non-energization time tc: 0.04 seconds
  Second energization time t2: 0.4 seconds
  Current ratio I1/I2: 0.7
  Retention time after end of energization: 0.1 seconds A hot-dip galvannealed steel sheet was always used as the steel sheet $1d$ in FIG. 3, two sheets were superimposed and spot-welded with a steel sheet to be evaluated as $1e$, and the LME occurrence state of the steel sheet on the 1e side was evaluated by cross-sectional observation.

Here, some of the steel sheets shown in the tables were not plated. However, even in a case where the steel sheet does not have plating, since the surface of the steel sheet on the 1e side is in contact with the galvanized surface of the steel sheet 1d, the liquid metal embrittlement cracking resistance can be evaluated even in a case of a cold-rolled steel sheet in which the surface of the steel sheet on the 1e side is not galvanized.

With respect to an aspect of LME, the cross section of the steel sheet including the center of the nugget is polished, SEM observation is performed by the same method as described above, and the presence or absence of cracks at three locations: an inner crack 3a between the steel sheets, an outer crack 3b at a contact portion between the steel sheet and the spot welding electrode, and an outer crack 3c at a steel sheet portion that is not in direct contact with the electrode was evaluated.

TABLE 1-1

| No. | C | Si | Mn | P | S | N | Al |
|---|---|---|---|---|---|---|---|
| A | 0.199 | 1.20 | 2.7 | 0.0273 | 0.0063 | 0.0073 | 0.33 |
| B | 0.160 | 0.34 | 2.4 | 0.0024 | 0.0009 | 0.0061 | 1.62 |
| C | 0.276 | 0.96 | 1.7 | 0.0045 | 0.0082 | 0.0035 | 0.53 |
| D | 0.183 | 1.31 | 1.8 | 0.0017 | 0.0008 | 0.0043 | 0.86 |
| E | 0.169 | 1.72 | 3.1 | 0.0024 | 0.0028 | 0.0088 | 1.40 |
| F | 0.259 | 0.78 | 3.4 | 0.0047 | 0.0016 | 0.0082 | 1.03 |
| G | 0.247 | 1.51 | 2.9 | 0.0096 | 0.0006 | 0.0030 | 1.20 |
| H | 0.298 | 0.33 | 3.9 | 0.0338 | 0.0006 | 0.0050 | 1.95 |
| I | 0.230 | 0.52 | 2.1 | 0.0062 | 0.0005 | 0.0098 | 0.75 |
| J | 0.215 | 0.70 | 3.6 | 0.0028 | 0.0008 | 0.0066 | 1.77 |
| K | 0.221 | 1.77 | 1.9 | 0.0063 | 0.0009 | 0.0097 | 1.08 |
| L | 0.264 | 1.38 | 2.4 | 0.0040 | 0.0081 | 0.0088 | 0.53 |
| M | 0.278 | 1.97 | 2.9 | 0.0269 | 0.0009 | 0.0066 | 0.80 |
| N | 0.174 | 1.53 | 2.2 | 0.0023 | 0.0009 | 0.0051 | 0.92 |
| O | 0.200 | 0.99 | 2.6 | 0.0026 | 0.0009 | 0.0045 | 1.41 |
| P | 0.250 | 1.88 | 3.6 | 0.0022 | 0.0012 | 0.0030 | 0.36 |
| Q | 0.297 | 0.56 | 3.1 | 0.0039 | 0.0026 | 0.0072 | 1.57 |
| R | 0.189 | 0.35 | 3.9 | 0.0335 | 0.0009 | 0.0035 | 1.20 |
| S | 0.232 | 0.39 | 1.6 | 0.0034 | 0.0068 | 0.0080 | 0.91 |
| T | 0.159 | 0.35 | 3.3 | 0.0092 | 0.0009 | 0.0059 | 0.73 |
| U | <u>0.147</u> | 1.97 | 3.5 | 0.0044 | 0.0081 | 0.0033 | 1.25 |
| V | <u>0.303</u> | 0.79 | 3.5 | 0.0050 | 0.0053 | 0.0028 | 0.51 |
| W | 0.258 | 1.59 | <u>1.4</u> | 0.0042 | 0.0008 | 0.0029 | 0.63 |
| X | 0.189 | 0.32 | <u>1.9</u> | 0.0342 | 0.0014 | 0.0023 | 1.38 |
| Y | 0.158 | 0.41 | 3.2 | 0.0029 | 0.0008 | <u>0.0102</u> | 1.37 |
| Z | 0.221 | 0.61 | 2.1 | 0.0046 | 0.0024 | 0.0032 | <u>0.23</u> |
| AA | 0.245 | 0.96 | 2.7 | 0.0308 | 0.0006 | 0.0047 | <u>2.05</u> |

TABLE 1-2

| No. | B | Ti | Nb | V | Mo | Cr | Co | Ni | Cu |
|---|---|---|---|---|---|---|---|---|---|
| A | | | | | | | | | |
| B | | | | | | | | | |
| C | | | | | | | | | |
| D | | | | | | | | | |
| E | | | | | | | | | |
| F | | | | | | | | | |
| G | | | | | | | | | |
| H | | | | | | | | | |
| I | | | | | | | | | |
| J | | | | | | | | | |
| K | 0.0028 | 0.017 | | | | | | | |
| L | | | | | 0.044 | 0.138 | 0.264 | | |
| M | | 0.015 | | | | 0.057 | | 0.496 | 0.109 |
| N | | 0.047 | 0.017 | 0.339 | | | | | |
| O | | | | | | | 0.039 | 0.653 | |
| P | | | | | | 0.038 | 0.034 | | |
| Q | | | | | | 0.038 | 0.034 | | |
| R | 0.0014 | 0.034 | | | | | | | |
| S | | 0.008 | 0.031 | 0.052 | | | | | |
| T | | | | | | | | | |
| U | | | | | 0.024 | 0.057 | | | 0.049 |
| V | | 0.019 | 0.016 | 0.089 | | | | | |
| W | 0.0012 | 0.038 | | | | 0.067 | 0.111 | | |
| X | | | | | | | | | |
| Y | | | | | | | | | |
| Z | | | | | | | | | |
| AA | | | | | | | | | |

TABLE 1-3

| No. | O | W | Ta | Sn | Sb | As | Mg | Ca | Y | Zr | La | Ce | Ac3 |
|---|---|---|---|---|---|---|---|---|---|---|---|---|---|
| A | | | | | | | | | | | | | 851 |
| B | | | | | | | | | | | | | 968 |
| C | | | | | | | | | | | | | 862 |
| D | | | | | | | | | | | | | 932 |
| E | | | | | | | | | | | | | 980 |
| F | | | | | | | | | | | | | 866 |
| G | | | | | | | | | | | | | 940 |
| H | | | | | | | | | | | | | 955 |
| I | | | | | | | | | | | | | 867 |
| J | | | | | | | | | | | | | 954 |
| K | | | | | | | | | | | | | 977 |
| L | | | | | | | | | | | | | 862 |
| M | | | | | | | | | | | | | 909 |
| N | | | | | | | | | | | | | 994 |
| O | | | | | | | | | | | | | 947 |
| P | 0.0047 | | | | | 0.002 | 0.004 | 0.013 | 0.004 | 0.004 | | | 829 |
| Q | | 0.007 | 0.009 | 0.008 | | | | | | 0.033 | 0.006 | 0.005 | 923 |
| R | | | | | 0.004 | | | | | 0.004 | 0.002 | | 901 |
| S | 0.0008 | | | | | 0.003 | 0.002 | | | 0.014 | 0.005 | | 902 |
| T | | | 0.005 | | | 0.003 | 0.005 | | | | 0.006 | 0.012 | 840 |
| U | | | | | | | | | | | | | 967 |
| V | 0.0051 | | | | 0.003 | 0.003 | 0.025 | 0.006 | 0.012 | | | | 810 |
| W | | 0.004 | 0.042 | 0.021 | | | | | | 0.005 | 0.003 | 0.004 | 928 |
| X | | | | | | | | | | | | | 969 |
| Y | | | | | | | | | | | | | 918 |
| Z | | | | | | | | | | | | | 810 |
| AA | | | | | | | | | | | | | 1039 |

TABLE 2-1

| | | Continuous casting step | Hot rolling step | | | Cold rolling step |
|---|---|---|---|---|---|---|
| | | | Finish rolling | | | |
| No. | Steel type | Cooling rate ° C./s | Bending strain % | finishing temperature ° C. | Coiling temperature ° C. | Cold rolling ratio % |
| 1 | A | 3 | 1.5 | 854 | 199 | 5 |
| 2 | B | 8 | 1.6 | 936 | 56 | 3 |
| 3 | C | 5 | 0.5 | 885 | 104 | 9 |
| 4 | D | 7 | 1.2 | 906 | 470 | 11 |
| 5 | E | 1 | 0.9 | 963 | 144 | 17 |
| 6 | F | 9 | 1.0 | 873 | 431 | 14 |
| 7 | G | 9 | 0.7 | 946 | 341 | 19 |
| 8 | H | 4 | 1.8 | 995 | 284 | 7 |
| 9 | I | 2 | 2.0 | 981 | 230 | 1 |
| 10 | J | 6 | 1.3 | 917 | 398 | 15 |
| 11 | K | 10 | 1.5 | 854 | 47 | 20 |
| 12 | L | 7 | 1.6 | 920 | 202 | 17 |
| 13 | M | 3 | 0.7 | 979 | 224 | 1 |
| 14 | N | 8 | 0.6 | 991 | 471 | 11 |
| 15 | O | 5 | 1.4 | 901 | 90 | 7 |
| 16 | P | 2 | 1.8 | 960 | 396 | 13 |
| 17 | Q | 1 | 1.0 | 950 | 432 | 3 |
| 18 | R | 8 | 1.9 | 882 | 283 | 15 |
| 19 | S | 6 | 0.8 | 933 | 347 | 9 |
| 20 | T | 4 | 1.1 | 873 | 151 | 5 |
| 21 | A | 8 | 1.2 | 871 | 385 | 3 |
| 22 | B | 7 | 1.6 | 905 | 182 | 19 |
| 23 | C | 10 | 0.7 | 948 | 491 | 7 |
| 24 | D | 4 | 0.6 | 977 | 81 | 13 |
| 25 | E | 3 | 1.4 | 884 | 290 | 15 |
| 26 | F | 5 | 1.7 | 961 | 437 | 17 |
| 27 | G | 6 | 0.9 | 921 | 152 | 11 |
| 28 | H | 1 | 1.9 | 931 | 44 | 9 |
| 29 | I | 8 | 1.5 | 995 | 339 | 1 |
| 30 | J | 2 | 1.0 | 838 | 241 | 5 |
| 31 | K | 5 | 1.6 | 980 | 480 | 7 |
| 32 | L | 7 | 0.6 | 858 | 445 | 13 |
| 33 | M | 9 | 2.0 | 945 | 92 | 9 |
| 34 | U | 3 | 1.2 | 872 | 179 | 0 |
| 35 | V | 6 | 0.7 | 962 | 225 | 11 |
| 36 | W | 1 | 1.5 | 906 | 135 | 15 |
| 37 | X | 4 | 0.8 | 919 | 52 | 17 |
| 38 | Y | 8 | 1.1 | 996 | 331 | 20 |
| 39 | Z | 6 | 1.3 | 886 | 374 | 3 |
| 40 | AA | 2 | 1.8 | Subsequent test is stopped because of slab cracking due to Al. | | |
| 41 | N | 0.3 | 0.9 | 912 | 198 | 1 |
| 42 | O | 14 | 0.5 | 857 | 167 | 17 |
| 43 | P | 8 | 0.4 | 993 | 113 | 18 |
| 44 | Q | 7 | 2.3 | 980 | 211 | 13 |
| 45 | R | 5 | 1.0 | 845 | 58 | 8 |
| 46 | A | 8 | 1.6 | 954 | 510 | 10 |
| 47 | B | 6 | 1.3 | 950 | 455 | 23 |
| 48 | C | 10 | 1.9 | 969 | 367 | 2 |
| 49 | E | 4 | 1.6 | 892 | 310 | 16 |
| 50 | G | 7 | 1.4 | 909 | 224 | 17 |
| 51 | I | 1 | 0.9 | 981 | 456 | 14 |
| 52 | K | 2 | 1.9 | 964 | 313 | 3 |
| 53 | L | 4 | 1.3 | 953 | 132 | 6 |
| 54 | B | 6 | 1.1 | 932 | 356 | 8 |

TABLE 2-2

| | Continuous casting step | | | | | Remarks | | |
|---|---|---|---|---|---|---|---|---|
| No. | Heating temperature ° C. | Oxygen potential | Cooling rate ° C./s | Cooling stop temperature ° C. | Retention time at $M_6$ - 100° C. or higher$^s$ | Ferrite fraction Sc. | Bs | Ms |
| 1 | 783 | −0.87 | 48 | 274 | 281 | 22 | 482 | 314 |
| 2 | 896 | −1.01 | 43 | 346 | 99 | 36 | 632 | 364 |
| 3 | 768 | −1.04 | 41 | 301 | 160 | 23 | 565 | 307 |

TABLE 2-2-continued

| | Continuous casting step | | | | | Remarks | | |
|---|---|---|---|---|---|---|---|---|
| No. | Heating temperature ° C. | Oxygen potential | Cooling rate ° C./s | Cooling stop temperature ° C. | Retention time at $M_6$ - 100° C. or higher$^s$ | Ferrite fraction Sc. | Bs | Ms |
| 4 | 858 | −0.88 | 19 | 321 | 399 | 34 | 589 | 343 |
| 5 | 898 | −0.17 | 12 | 327 | 359 | 19 | 515 | 334 |
| 6 | 769 | −0.01 | 31 | 275 | 527 | 17 | 467 | 282 |
| 7 | 853 | −0.72 | 15 | 229 | 472 | 37 | 473 | 254 |
| 8 | 867 | −0.56 | 23 | 242 | 57 | 11 | 496 | 278 |
| 9 | 784 | −0.55 | 37 | 271 | 215 | 29 | 570 | 320 |
| 10 | 894 | −0.61 | 27 | 264 | 572 | 33 | 501 | 286 |
| 11 | 882 | −1.14 | 23 | 331 | 65 | 22 | 577 | 334 |
| 12 | 772 | −0.26 | 48 | 239 | 458 | 36 | 461 | 248 |
| 13 | 899 | −0.79 | 33 | 262 | 427 | 10 | 424 | 269 |
| 14 | 899 | −1.44 | 46 | 324 | 529 | 24 | 563 | 350 |
| 15 | 874 | −1.17 | 14 | 273 | 176 | 37 | 523 | 300 |
| 16 | 789 | −0.95 | 29 | 172 | 221 | 35 | 340 | 211 |
| 17 | 898 | −0.83 | 21 | 226 | 136 | 25 | 513 | 266 |
| 18 | 882 | −0.68 | 34 | 281 | 311 | 19 | 472 | 311 |
| 19 | 842 | −0.58 | 37 | 320 | 102 | 28 | 632 | 344 |
| 20 | 760 | −0.68 | 38 | 289 | 63 | 36 | 489 | 316 |
| 21 | 811 | −0.33 | 27 | 269 | 284 | 35 | 467 | 290 |
| 22 | 886 | −0.99 | 43 | 335 | 559 | 37 | 631 | 362 |
| 23 | 823 | −1.43 | 44 | 248 | 335 | 32 | 551 | 285 |
| 24 | 898 | −0.94 | 12 | 315 | 346 | 34 | 589 | 343 |
| 25 | 900 | −1.18 | 33 | 338 | 173 | 11 | 520 | 343 |
| 26 | 860 | −0.58 | 20 | 297 | 413 | 6 | 477 | 299 |
| 27 | 900 | −0.59 | 16 | 221 | 48 | 35 | 477 | 260 |
| 28 | 876 | −0.92 | 25 | 241 | 106 | 14 | 493 | 272 |
| 29 | 843 | −0.87 | 29 | 319 | 565 | 24 | 576 | 331 |
| 30 | 899 | −1.08 | 48 | 282 | 288 | 34 | 500 | 284 |
| 31 | 895 | −1.12 | 11 | 274 | 519 | 36 | 559 | 305 |
| 32 | 783 | −0.62 | 44 | 219 | 220 | 34 | 465 | 254 |
| 33 | 822 | −1.09 | 35 | 205 | 458 | 34 | 391 | 216 |
| 34 | 898 | −0.31 | 41 | 271 | 359 | 31 | 454 | 311 |
| 35 | 777 | −1.06 | 29 | 166 | 423 | 33 | 380 | 202 |
| 36 | 829 | −0.7 | 46 | 242 | 490 | 44 | 540 | 260 |
| 37 | 881 | −1.44 | 24 | 336 | 561 | 29 | 657 | 370 |
| 38 | 900 | −0.56 | 12 | 318 | 200 | 18 | 557 | 358 |
| 39 | 733 | −0.82 | 44 | 259 | 303 | 37 | 523 | 296 |
| 40 | Subsequent test is stopped because of slab cracking due to Al. | | | | | | | |
| 41 | 898 | −0.63 | 21 | 291 | 151 | 37 | 550 | 328 |
| 42 | 885 | −0.57 | 38 | 263 | 156 | 36 | 525 | 303 |
| 43 | 731 | −0.65 | 16 | 230 | 536 | 19 | 362 | 247 |
| 44 | 842 | −1.21 | 20 | 205 | 369 | 36 | 493 | 233 |
| 45 | 812 | −0.08 | 27 | 273 | 568 | 19 | 472 | 311 |
| 46 | 779 | −0.68 | 14 | 291 | 482 | 20 | 484 | 317 |
| 47 | 877 | −0.18 | 37 | 369 | 112 | 34 | 635 | 368 |
| 48 | 750 | −0.6 | 32 | — | — | 100 | — | — |
| 49 | 889 | −1.54 | 29 | 308 | 54 | 31 | 504 | 317 |
| 50 | 842 | −0.1 | 9 | 201 | 162 | 41 | 466 | 241 |
| 51 | 834 | −0.2 | 32 | 187 | 249 | 33 | 565 | 311 |
| 52 | 880 | −0.9 | 42 | 290 | 8 | 29 | 569 | 321 |
| 53 | 821 | −1.0 | 26 | 238 | 620 | 36 | 461 | 248 |
| 54 | 894 | −0.99 | 41 | 354 | 299 | 34 | 632 | 368 |

TABLE 3-1

| | Bainite/martensite | | | Residual γ | Number density | Internal oxidation layer | |
|---|---|---|---|---|---|---|---|
| No. | Fraction % | Tempered martensite fraction % | Aspect ratio | fraction % | of AlN pieces/mm$^2$ | Existence depth μm | Grain boundary coverage % |
| 1 | 66 | 38 | 9.1 | 12 | 3900 | 6.5 | 74 |
| 2 | 53 | 17 | 9.7 | 11 | 5750 | 5.4 | 62 |
| 3 | 66 | 6 | 5.4 | 11 | 5825 | 5.8 | 68 |
| 4 | 54 | 21 | 9.5 | 12 | 3375 | 6.2 | 75 |
| 5 | 68 | 7 | 7.2 | 13 | 5875 | 6.3 | 66 |
| 6 | 71 | 6 | 8.0 | 12 | 5150 | 5.6 | 75 |
| 7 | 54 | 23 | 9.1 | 9 | 5075 | 5.7 | 76 |
| 8 | 76 | 34 | 6.6 | 13 | 5950 | 7.0 | 67 |

TABLE 3-1-continued

| | Bainite/martensite | | | Residual γ | Number density | Internal oxidation layer | |
| | Fraction | Tempered martensite | Aspect | fraction | of AlN | Existence | Grain boundary |
| No. | % | fraction % | ratio | % | pieces/mm² | depth μm | coverage % |
|---|---|---|---|---|---|---|---|
| 9 | 59 | 49 | 6.9 | 8 | 5100 | 5.5 | 76 |
| 10 | 58 | 21 | 6.7 | 9 | 5675 | 5.5 | 69 |
| 11 | 69 | 5 | 6.4 | 9 | 3950 | 5.7 | 73 |
| 12 | 52 | 9 | 9.2 | 12 | 5950 | 6.9 | 65 |
| 13 | 81 | 7 | 7.9 | 9 | 3375 | 6.3 | 74 |
| 14 | 66 | 25 | 5.1 | 10 | 4550 | 7.2 | 68 |
| 15 | 52 | 27 | 6.1 | 11 | 5925 | 6.1 | 77 |
| 16 | 56 | 39 | 9.2 | 9 | 5050 | 6.0 | 75 |
| 17 | 53 | 63 | 8.4 | 12 | 4100 | 6.8 | 69 |
| 18 | 69 | 30 | 9.1 | 12 | 4050 | 6.0 | 70 |
| 19 | 60 | 22 | 9.4 | 12 | 3350 | 7.0 | 72 |
| 20 | 52 | 26 | 8.0 | 12 | 5375 | 6.3 | 76 |
| 21 | 54 | 20 | 9.7 | 11 | 5725 | 7.0 | 63 |
| 22 | 51 | 26 | 9.1 | 12 | 4600 | 7.1 | 62 |
| 23 | 57 | 35 | 8.5 | 9 | 5950 | 7.2 | 66 |
| 24 | 52 | 28 | 7.3 | 14 | 5600 | 7.1 | 69 |
| 25 | 76 | 5 | 9.1 | 13 | 3775 | 6.8 | 77 |
| 26 | 82 | 5 | 8.5 | 12 | 5575 | 6.8 | 75 |
| 27 | 53 | 38 | 8.0 | 12 | 5100 | 6.6 | 76 |
| 28 | 75 | 31 | 6.5 | 11 | 4900 | 5.3 | 77 |
| 29 | 63 | 11 | 9.9 | 13 | 5950 | 5.4 | 64 |
| 30 | 55 | 5 | 7.1 | 11 | 5725 | 5.9 | 74 |
| 31 | 52 | 30 | 9.4 | 12 | 5800 | 6.8 | 77 |
| 32 | 54 | 33 | 9.5 | 12 | 4350 | 7.2 | 63 |
| 33 | 56 | 11 | 8.4 | 10 | 5950 | 6.3 | 68 |
| 34 | 52 | 38 | 9.9 | 17 | 5550 | 5.9 | 66 |
| 35 | 53 | 35 | 9.5 | 14 | 5450 | 6.7 | 72 |
| 36 | <u>43</u> | 17 | 5.4 | 13 | 3375 | 6.7 | 70 |
| 37 | <u>62</u> | 33 | 8.6 | 9 | 2250 | 7.2 | 66 |
| 38 | 73 | 38 | 8.4 | 9 | <u>5950</u> | 6.3 | 69 |
| 39 | 51 | 37 | 9.6 | 12 | <u>2950</u> | 7.2 | 69 |
| 40 | Subsequent test is stopped because of slab cracking due to Al. | | | | | | |
| 41 | 52 | 35 | 9.7 | 11 | <u>2950</u> | 6.5 | 75 |
| 42 | 51 | 39 | 7.5 | 13 | <u>6950</u> | 6.1 | 76 |
| 43 | 70 | 16 | 8.8 | 11 | <u>2250</u> | 7.2 | 76 |
| 44 | 56 | 28 | 5.8 | 8 | <u>6950</u> | 6.7 | 75 |
| 45 | 68 | 38 | <u>2.4</u> | 13 | 5575 | 5.3 | 66 |
| 46 | 67 | 25 | <u>3.8</u> | 13 | 5950 | 6.8 | 65 |
| 47 | 58 | 0 | <u>2.8</u> | 8 | 5550 | 6.6 | 67 |
| 48 | 0 | 0 | — | 0 | 3900 | 5.9 | 66 |
| 49 | <u>56</u> | 8 | <u>7.8</u> | <u>13</u> | 5300 | <u>2.0</u> | <u>47</u> |
| 50 | <u>45</u> | 39 | 7.6 | 14 | 5950 | <u>5.9</u> | <u>70</u> |
| 51 | <u>66</u> | 64 | 9.4 | <u>1</u> | 4900 | 6.4 | 68 |
| 52 | 58 | 29 | 6.1 | <u>5</u> | 5875 | 5.7 | 70 |
| 53 | 53 | 51 | 8.3 | <u>11</u> | 4050 | 6.7 | 74 |
| 54 | 56 | 13 | 9.7 | 10 | 5675 | 5.2 | 61 |

TABLE 3-2

| No. | Classification | Strength MPa | Strength × elongation MPa % | Elongation × hole expansion rate %% | Uniform elongation % | Presence or absence of LME cracking |
|---|---|---|---|---|---|---|
| 1 | Example | 1221 | 18315 | 570 | 10 | Absent |
| 2 | Example | 1020 | 20400 | 720 | 13 | Absent |
| 3 | Example | 1225 | 15925 | 520 | 7 | Absent |
| 4 | Example | 1028 | 22616 | 550 | 14 | Absent |
| 5 | Example | 1230 | 19680 | 448 | 11 | Absent |
| 6 | Example | 1193 | 16702 | 504 | 9 | Absent |
| 7 | Example | 1030 | 23690 | 667 | 12 | Absent |
| 8 | Example | 1208 | 19328 | 592 | 10 | Absent |
| 9 | Example | 1029 | 21609 | 714 | 13 | Absent |
| 10 | Example | 1029 | 24696 | 744 | 16 | Absent |
| 11 | Example | 1229 | 15977 | 533 | 7 | Absent |
| 12 | Example | 1001 | 25025 | 750 | 15 | Absent |
| 13 | Example | 1230 | 15990 | 572 | 6 | Absent |
| 14 | Example | 1211 | 15743 | 585 | 7 | Absent |
| 15 | Example | 986 | 24650 | 675 | 13 | Absent |
| 16 | Example | 1014 | 22308 | 748 | 14 | Absent |
| 17 | Example | 1218 | 19488 | 480 | 10 | Absent |

TABLE 3-2-continued

| No. | Classification | Strength MPa | Strength × elongation MPa % | Elongation × hole expansion rate %% | Uniform elongation % | Presence or absence of LME cracking |
|---|---|---|---|---|---|---|
| 18 | Example | 1204 | 20468 | 510 | 10 | Absent |
| 19 | Example | 1228 | 15964 | 429 | 8 | Absent |
| 20 | Example | 1030 | 23690 | 736 | 13 | Absent |
| 21 | Example | 1026 | 24624 | 744 | 16 | Absent |
| 22 | Example | 1010 | 23230 | 644 | 15 | Absent |
| 23 | Example | 1012 | 25300 | 725 | 16 | Absent |
| 24 | Example | 1028 | 21588 | 714 | 12 | Absent |
| 25 | Example | 1228 | 19648 | 496 | 10 | Absent |
| 26 | Example | 1210 | 15730 | 520 | 8 | Absent |
| 27 | Example | 1026 | 20520 | 640 | 11 | Absent |
| 28 | Example | 1199 | 20383 | 527 | 10 | Absent |
| 29 | Example | 1218 | 15834 | 598 | 8 | Absent |
| 30 | Example | 1026 | 21546 | 609 | 13 | Absent |
| 31 | Example | 1013 | 22286 | 748 | 14 | Absent |
| 32 | Example | 1024 | 24576 | 624 | 14 | Absent |
| 33 | Example | 1029 | 22638 | 682 | 14 | Absent |
| 34 | Comparative Example | <u>791</u> | 19775 | 725 | 16 | Absent |
| 35 | Comparative Example | <u>891</u> | <u>12474</u> | <u>280</u> | 9 | Absent |
| 36 | Comparative Example | <u>902</u> | 25256 | 672 | 18 | Absent |
| 37 | Comparative Example | 1223 | 15899 | 598 | 7 | Present |
| 38 | Comparative Example | 1204 | 18060 | <u>365</u> | 9 | Absent |
| 39 | Comparative Example | 993 | 24825 | 750 | 15 | Present |
| 40 | Comparative Example | <u>Subsequent test is stopped because of slab cracking due to Al.</u> | | | | |
| 41 | Comparative Example | 1029 | 23667 | <u>367</u> | 15 | Absent |
| 42 | Comparative Example | 1019 | 21399 | <u>335</u> | 13 | Absent |
| 43 | Comparative Example | 1224 | 18360 | <u>320</u> | 8 | Absent |
| 44 | Comparative Example | 1020 | 21420 | <u>388</u> | 13 | Absent |
| 45 | Comparative Example | 1181 | <u>12077</u> | 405 | 5 | Absent |
| 46 | Comparative Example | 1230 | <u>14680</u> | 492 | 7 | Absent |
| 47 | Comparative Example | 1017 | <u>11874</u> | 516 | 7 | Absent |
| 48 | Comparative Example | <u>722</u> | 25270 | 1065 | 19 | Absent |
| 49 | Comparative Example | 1029 | 21609 | 609 | 13 | Present |
| 50 | Comparative Example | <u>929</u> | 25083 | 508 | 18 | Absent |
| 51 | Comparative Example | 1027 | <u>10567</u> | 403 | 6 | Absent |
| 52 | Comparative Example | 1290 | <u>11680</u> | 408 | 5 | Absent |
| 53 | Comparative Example | <u>973</u> | 25298 | 728 | 17 | Absent |
| 54 | Example | 1026 | 21600 | 718 | 13 | Absent |

Examples 1 to 33 which are within the scope of the present invention, have an excellent strength-ductility balance, can suppress LME, and have higher hole expansibility. On the other hand, in Comparative Examples 34 to 54, which were outside the scope of the present invention, one or more evaluation items were rejected.

In Comparative Example 34 (Component No. U), the C content was insufficient. Therefore, in Comparative Example 34, the tensile strength was insufficient.

In Comparative Example 35 (Component No. V), the C content was excessive. Therefore, in Comparative Example 35, the tensile strength, TS×El, and El×λ were insufficient.

In Comparative Example 36 (Component No. W), the Mn content was insufficient. Therefore, in Comparative Example 36, the total amount of bainite and martensite was insufficient, and further, the tensile strength was insufficient.

In Comparative Example 37 (Component No. X), the N content was insufficient, so that the number density of AlN at the depth position of 30 μm from the surface of the steel sheet was insufficient. Therefore, in Comparative Example 37, the LME resistance was insufficient.

In Comparative Example 38 (Component No. Y), the N content was excessive. Therefore, in Comparative Example 38, El×λ was insufficient.

In Comparative Example 39 (Component No. Z), the Al content was insufficient, so that the number density of AlN at the depth position of 30 μm from the surface of the steel sheet was insufficient. Therefore, in Comparative Example 39, the LME resistance was insufficient.

In Comparative Example 40 (Component No. AA), the Al content was excessive. Therefore, in Comparative Example 40, slab cracking occurred, and the steel sheet could not be manufactured.

In Comparative Example 41, the number density of AlN at the depth position of 30 μm from the surface of the steel sheet was insufficient. Therefore, in Comparative Example 41, El×λ was insufficient. It is presumed that this is because the cooling rate during continuous casting was insufficient.

In Comparative Example 42, the number density of AlN at the depth position of 30 μm from the surface of the steel sheet was excessive. Therefore, in Comparative Example 42, El×λ was insufficient. It is presumed that this is because the cooling rate during continuous casting was excessive.

In Comparative Example 43, the number density of AlN at the depth position of 30 μm from the surface of the steel sheet was insufficient. Therefore, in Comparative Example 43, El×λ was insufficient. It is presumed that this is because the bending strain of the slab during continuous casting was insufficient.

In Comparative Example 44, the number density of AlN at the depth position of 30 μm from the surface of the steel sheet was excessive. Therefore, in Comparative Example 42, El×λ was insufficient. It is presumed that this is because the bending strain during continuous casting was excessive.

In Comparative Example 45, the aspect ratio of the prior austenite grain at the ¼ thickness portion of the steel sheet was small. Therefore, in Comparative Example 45, TS×El was insufficient. It is presumed that this is because the finish rolling finishing temperature was too low and the structure shape of the steel sheet before annealing became inappropriate.

In Comparative Example 46, the aspect ratio of the prior austenite grain at the ¼ thickness portion of the steel sheet was small. Therefore, in Comparative Example 46, TS×El was insufficient. It is presumed that this is because the coiling temperature was too high, ferrite and pearlite were generated in the steel sheet before annealing, and the structure shape thereof became inappropriate.

In Comparative Example 47, the aspect ratio of the prior austenite grain at the ¼ thickness portion of the steel sheet was small. Therefore, in Comparative Example 47, TS×El was insufficient. It is presumed that this is because the cold rolling ratio was too high, the dislocation density of the steel sheet before annealing became excessive, and recrystallization was promoted when the temperature for annealing was raised.

In Comparative Example 48, the total amount of martensite and bainite at the ¼ thickness portion of the steel sheet was insufficient. Therefore, in Comparative Example 48, the tensile strength was insufficient. It is presumed that this is because the heating temperature during annealing was insufficient and quenching could not be performed.

In Comparative Example 49, the internal oxidation layer did not extend the depth of 5.0 μm or more from the sheet surface and the grain boundary coverage of the oxide was insufficient. Therefore, in Comparative Example 49, the LME resistance was insufficient. It is presumed that this is because the oxygen potential during annealing was insufficient.

In Comparative Example 50, the total amount of martensite and bainite at the ¼ thickness portion of the steel sheet was insufficient. Therefore, in Comparative Example 50, the tensile strength was insufficient. It is presumed that this is because the cooling rate during annealing was insufficient and quenching could not be performed.

In Comparative Example 51, the amount of residual austenite at the ¼ thickness portion of the steel sheet was insufficient. Therefore, in Comparative Example 51, TS×El was insufficient. It is presumed that this is because the cooling stop temperature was too low.

In Comparative Example 52, the amount of residual austenite at the ¼ thickness portion of the steel sheet was insufficient. Therefore, in Comparative Example 52, TS×El was insufficient. It is presumed that this is because the retention time in the temperature range of (Ms point-100)° C. or higher and Bs point or lower was too short.

In Comparative Example 53, the tensile strength of the steel sheet was insufficient. It is presumed that this is because the retention time in the temperature range of (Ms point-100)° C. or higher and Bs point or lower was too long and the steel sheet was excessively tempered.

BRIEF DESCRIPTION OF THE REFERENCE SYMBOLS

1: steel sheet
11: sheet surface
12: grain boundary oxide
13: crystal grain boundary
14: coated grain boundary
15: uncoated grain boundary
R: resin
1a, 1b, 1c, 1d, 1e: steel sheet
2: nugget
3a: inner crack
3b: outer crack
3c: outer crack
4a: electrode
4b: electrode
5: electrode centerline
6: vertical line

The invention claimed is:

1. A steel sheet comprising, as a chemical composition, by mass %:
C: 0.150% or more and 0.300% or less;
Si: 0.30% or more and 2.50% or less;
Mn: 1.50% or more and 4.00% or less;
Al: 0.30% or more and 2.00% or less;
P: 0% or more and 0.0400% or less;
S: 0% or more and 0.0100% or less;
N: 0.0025% or more and 0.0100% or less;
O: 0% or more and 0.0060% or less;
Cr: 0% or more and 0.500% or less;
Ni: 0% or more and 1.000% or less;
Cu: 0% or more and 1.000% or less;
Mo: 0% or more and 0.500% or less;
Ti: 0% or more and 0.200% or less;
Nb: 0% or more and 0.200% or less;
V: 0% or more and 0.500% or less;
B: 0% or more and 0.0100% or less;
W: 0% or more and 0.100% or less;
Ta: 0% or more and 0.100% or less;
Sn: 0% or more and 0.050% or less;
Co: 0% or more and 0.500% or less;
Sb: 0% or more and 0.050% or less;
As: 0% or more and 0.050% or less;
Mg: 0% or more and 0.050% or less;
Ca: 0% or more and 0.040% or less;
Y: 0% or more and 0.050% or less;
La: 0% or more and 0.050% or less;

Ce: 0% or more and 0.050% or less;

Zr: 0% or more and 0.050% or less; and a remainder comprising Fe and impurities, wherein a metallographic structure at a ¼ thickness portion includes, by a volume percentage, a total of 50% or more of one or both of martensite and bainite and 8% or more of residual austenite, and a remainder being one or both of ferrite and pearlite, an average value of aspect ratios of prior austenite grains is 5.0 or more at the ¼ thickness portion, a number density of AlN is 3000 pieces/mm² or more and less than 6000 pieces/mm² at a depth position of 30 μm from a sheet surface, an internal oxidation layer in which at least a part of a crystal grain boundary is coated with an oxide is provided from the sheet surface to a depth of 5.0 μm or more, a grain boundary coverage of the oxide is 60% or more in a region from the sheet surface to a depth of 5.0 μm, the grain boundary coverage being a ratio of the length of the crystal grain boundary coated with the oxide to the total length if the crystal grain boundary in the region from the sheet surface to a depth of 5.0 μm, and a tensile strength is 980 MPa or more.

2. The steel sheet according to claim 1, wherein the steel sheet has a hot-dip galvanizing plating or a hot-dip galvannealing plating.

3. The steel sheet according to claim 1, wherein a part or all of the martensite at the ¼ thickness portion is tempered martensite, and a volume percentage of the tempered martensite at the ¼ thickness portion is 5% or more.

4. The steel sheet according to claim 2, wherein a part or all of the martensite at the ¼ thickness portion is tempered martensite, and a volume percentage of the tempered martensite at the ¼ thickness portion is 5% or more.

* * * * *